(12) United States Patent
Wolf et al.

(10) Patent No.: US 10,186,950 B2
(45) Date of Patent: Jan. 22, 2019

(54) POWER SUPPLY SYSTEM USING AN INDUCTOR ASSEMBLY

(71) Applicant: SMA SOLAR TECHNOLOGY AG, Niestetal (DE)

(72) Inventors: Henrik Wolf, Kassel (DE); Marek Rylko, Bielsko-Biala (PL); Milosz Handzel, Cracow (PL); Marcin Kacki, Zegocina (PL); Artur Mulawa, Bibice (PL); Piotr Otwinowski, Cracow (PL); Milosz Szarek, Cracow (PL)

(73) Assignee: SMA Solar Technology AG, Niestetal (DE)

( * ) Notice: Subject to any disclaimer, the term of this patent is extended or adjusted under 35 U.S.C. 154(b) by 0 days.

(21) Appl. No.: 15/953,828

(22) Filed: Apr. 16, 2018

(65) Prior Publication Data

US 2018/0234008 A1    Aug. 16, 2018

Related U.S. Application Data

(63) Continuation of application No. PCT/EP2016/073136, filed on Sep. 28, 2016.

(30) Foreign Application Priority Data

Oct. 16, 2015    (EP) .................................... 15190215

(51) Int. Cl.
*H02M 1/14*        (2006.01)
*H01F 37/00*       (2006.01)
(Continued)

(52) U.S. Cl.
CPC ............ *H02M 1/143* (2013.01); *H01F 27/24* (2013.01); *H01F 27/28* (2013.01); *H01F 37/00* (2013.01);
(Continued)

(58) Field of Classification Search
CPC .............................. H02M 1/143; H02M 3/155
See application file for complete search history.

(56) References Cited

U.S. PATENT DOCUMENTS

| 4,122,385 A | 10/1978 | Oberbeck |
| 7,839,251 B2 | 11/2010 | Sodo |
(Continued)

FOREIGN PATENT DOCUMENTS

| EP | 1914868 A1 | 4/2008 |
| WO | 2014081155 A1 | 11/2013 |
(Continued)

OTHER PUBLICATIONS

International Search Report dated Jan. 3, 2017 for International Application PCT/EP2016/073136.
(Continued)

*Primary Examiner* — Yusef A Ahmed
(74) *Attorney, Agent, or Firm* — Eschweiler & Potashnik, LLC

(57) ABSTRACT

An inductor assembly is disclosed that includes a magnetic core with a center leg and a number n of phase legs, wherein n is an integer and n>1. Each phase leg is magnetically connected to the center leg by an upper bridge and a lower bridge to form a magnetic main loop, a midpoint of the phase leg being magnetically connected to a center point of the center leg by a shunt element including a gap. Each phase leg further includes an upper inductor coil disposed on an upper phase leg section located between the midpoint and the upper bridge and a lower inductor coil disposed on a lower phase leg section located between the midpoint and the lower bridge. Alternatively, the upper and lower inductor coils are disposed on respective upper and lower bridges.

11 Claims, 12 Drawing Sheets

(51) Int. Cl.
*H01F 27/24* (2006.01)
*H01F 27/28* (2006.01)
*H02M 3/155* (2006.01)
*H02M 7/5387* (2007.01)
*H01F 27/38* (2006.01)

(52) U.S. Cl.
CPC ......... *H02M 3/155* (2013.01); *H02M 7/5387* (2013.01); *H01F 27/38* (2013.01)

(56) References Cited

U.S. PATENT DOCUMENTS

| | | | |
|---|---|---|---|
| 9,093,212 B1* | 7/2015 | Pinkerton | H01F 27/24 |
| 2004/0189432 A1* | 9/2004 | Yan | H01F 27/38 336/182 |
| 2006/0239046 A1* | 10/2006 | Zane | H02J 1/102 363/65 |
| 2008/0192960 A1* | 8/2008 | Nussbaum | H01F 37/00 381/120 |
| 2008/0239775 A1* | 10/2008 | Oughton | H02M 5/4585 363/134 |
| 2009/0231885 A1* | 9/2009 | Won | H01F 27/38 363/17 |
| 2009/0244936 A1* | 10/2009 | Falk | H02M 7/487 363/40 |
| 2010/0085138 A1* | 4/2010 | Vail | H01F 3/14 336/216 |
| 2012/0106207 A1* | 5/2012 | Tsai | H01F 27/324 363/21.02 |
| 2013/0194061 A1* | 8/2013 | Wei | H01F 17/043 336/192 |
| 2013/0200715 A1* | 8/2013 | Pettersson | H02M 7/537 307/82 |
| 2013/0200975 A1* | 8/2013 | Shudarek | H01F 3/14 336/170 |
| 2013/0301327 A1* | 11/2013 | Wagoner | H02M 1/126 363/132 |
| 2014/0049351 A1 | 2/2014 | Carsten | |
| 2014/0112039 A1* | 4/2014 | Correa Vasquez | H02M 7/487 363/98 |
| 2014/0159481 A1* | 6/2014 | Berger | H02M 7/493 307/10.1 |
| 2014/0204643 A1* | 7/2014 | Wagoner | H02M 7/5387 363/132 |
| 2014/0217827 A1* | 8/2014 | Cheek | H02M 7/5387 307/66 |
| 2014/0268952 A1* | 9/2014 | Tong | H02M 1/4241 363/89 |
| 2015/0062984 A1* | 3/2015 | Hu | H02M 1/12 363/71 |
| 2015/0280474 A1* | 10/2015 | Lunghard | B60L 11/1812 320/107 |
| 2015/0303792 A1* | 10/2015 | Kim | H01F 27/40 363/21.02 |
| 2016/0329811 A1* | 11/2016 | Du | H02M 3/1584 |
| 2016/0352249 A1* | 12/2016 | Agirman | H02M 7/493 |
| 2016/0352252 A1* | 12/2016 | Yu | H02M 7/537 |
| 2017/0011842 A1* | 1/2017 | Ishigaki | H01F 3/14 |
| 2017/0102421 A1* | 4/2017 | Ramirez | G01R 31/021 |

FOREIGN PATENT DOCUMENTS

| | | |
|---|---|---|
| WO | 2014194933 A1 | 12/2014 |
| WO | 2015125416 A1 | 8/2015 |

OTHER PUBLICATIONS

Gohil, Ghanshyamsinh, "Integrated Inductor for Interleaved Operation of Two Parallel Three-phase Voltage Source Converters", Department of Energy Technology, Aalborg University, Aalborg Denmark.

* cited by examiner

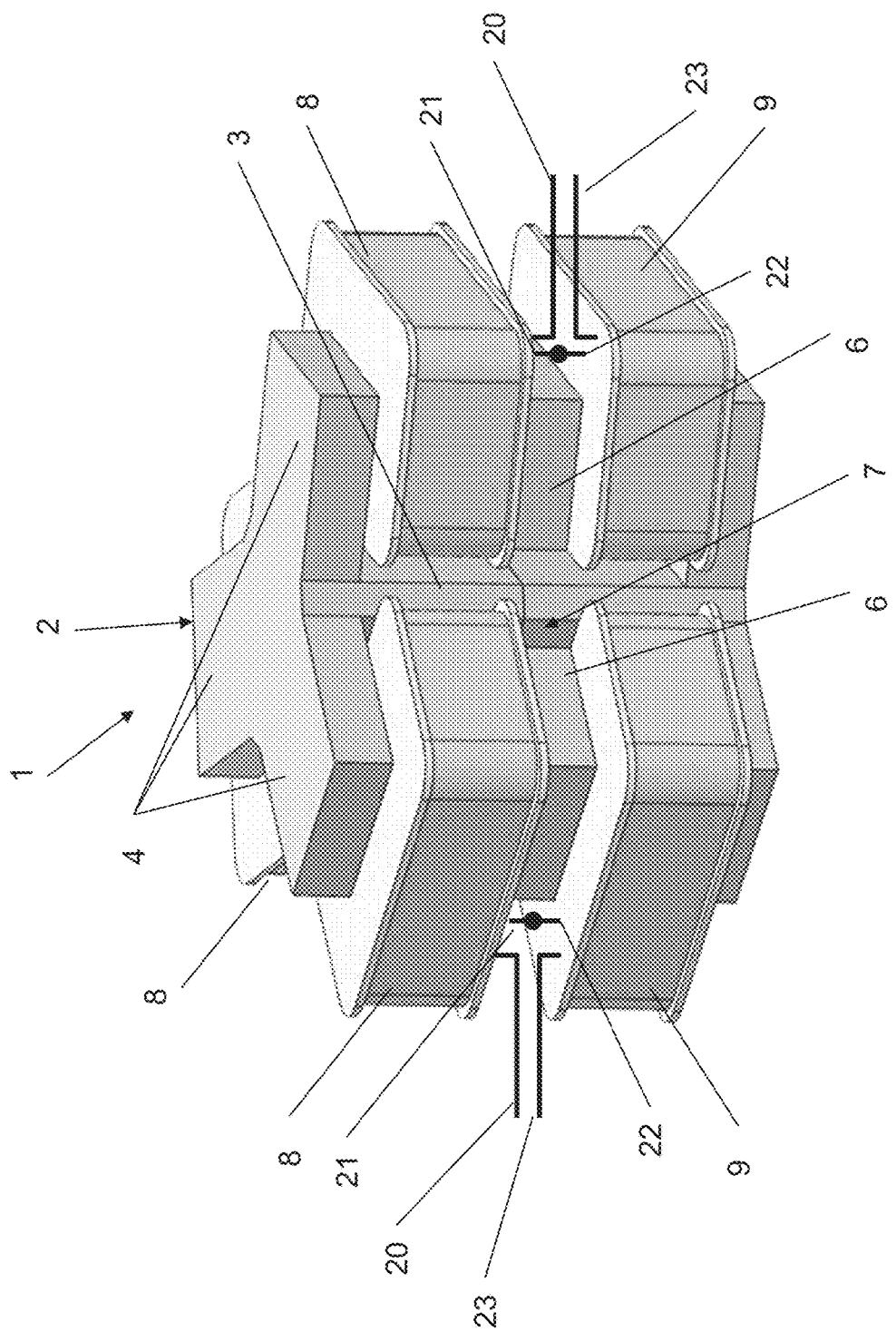

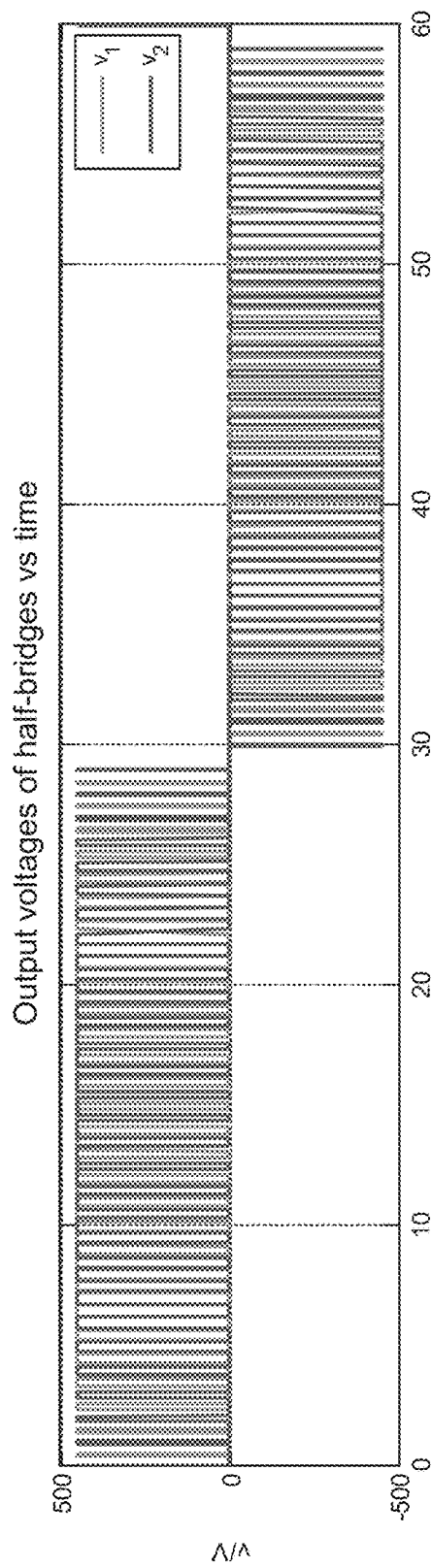
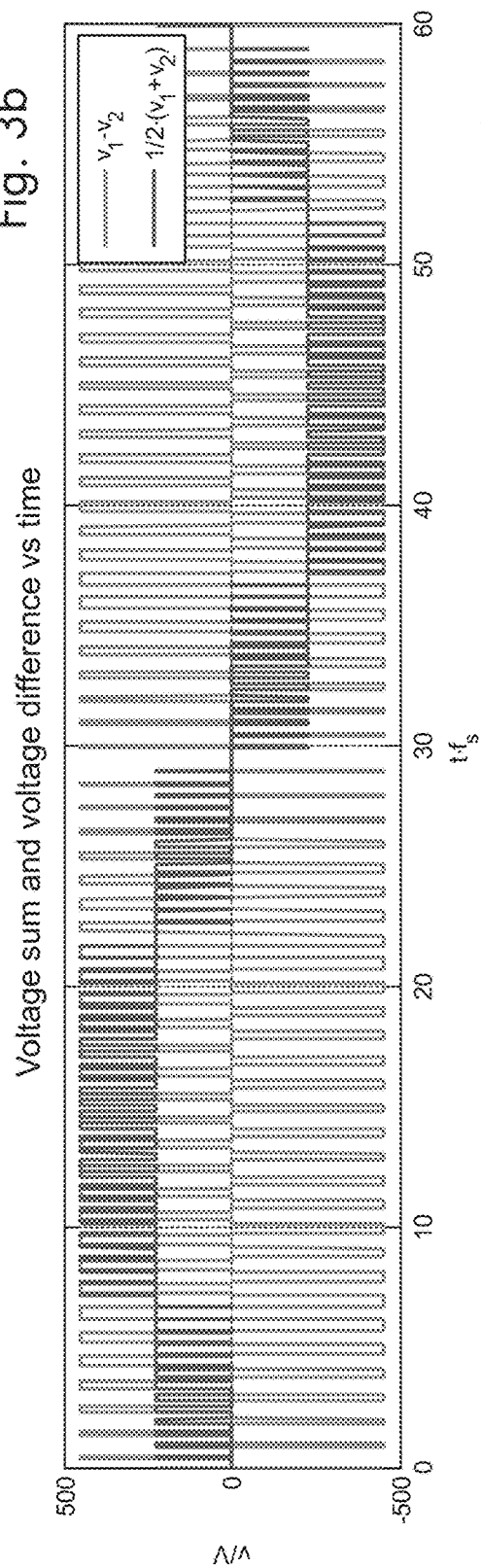
Fig. 3b
Fig. 3c

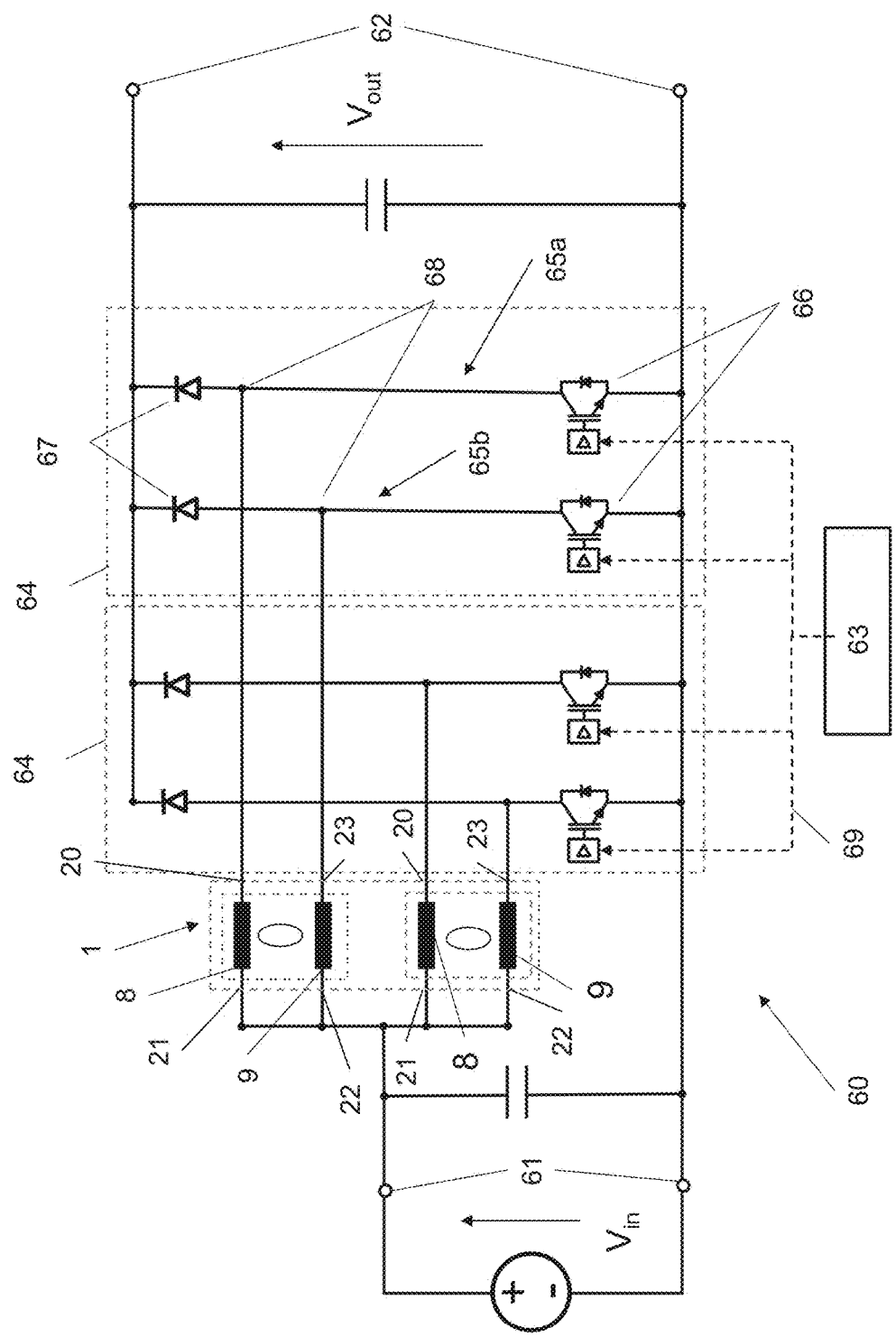

US 10,186,950 B2

POWER SUPPLY SYSTEM USING AN INDUCTOR ASSEMBLY

CROSS-REFERENCE TO RELATED APPLICATIONS

This application is a continuation of PCT Patent Application Number PCT/EP2016/073136, filed on Sep. 28, 2016, which claims priority to European Patent Application Number EP 15190215.2, filed on Oct. 16, 2015, which are hereby incorporated by reference in their entirety.

FIELD

The disclosure relates to an inductor assembly and a power supply system comprising such an inductor assembly.

BACKGROUND

The growing number of decentralized power generation systems using renewable energy sources like, for instance, photovoltaic energy, wind energy or biomass energy lead to high demand of switching mode power supply systems for converting DC-power into AC-power useable for feeding into the utility grid. For that, energy conversion DC/AC-converters—with or without an upstream connected DC/DC—converter are used. A power loss during the energy conversion has to be as low as possible. On the other hand, DC/AC-converters connected to the utility grid have to comply with a maximum allowed total harmonic distortion (THD) when feeding the AC power into the utility grid. Another requirement apart from the high efficiency for the grid tied DC/AC-converters is a large power density. A power supply system has to be able to convert a large power amount with a mass—and equivalently a cost—of the power converter as low as possible.

In order to react on these requirements, todays power supply systems are using multiple switching paths connected in parallel to each other. With each switching path the nominal power to be converted by a particular power supply system can be increased without having a tremendous effect on its mass or the cost—at least compared to the case in which two power supply systems are connected in parallel. In order to minimize a voltage ripple—either at a DC-link capacitance of a DC/AC-converter or at an output capacitance of a DC/DC converter—the multiple switching paths of the power supply system are operated in an interleaved manner.

However, that interleaved control manner typically leads to additional power losses due to a generation of circulating currents which flow from one switching path to another parallel connected switching path without leaving the output of the power supply system.

The document WO 2014/194933 A1 discloses a five-level active neutral-point clamping inverter for converting a bipolar DC voltage to a three-phase AC output voltage. The converter comprises first, second and third input terminals (P, MP, N) and first, second and third output terminals. The inverter further comprises first, second and third multistate switching cells (MSSC), each comprising three input terminals respectively connected to the input terminals of the inverter and respectively first, second and third output terminals. The output terminals of the first, second and third multi-state switching cell are connected via an inductor to said first, second and third output terminal of the inverter. Furthermore each respective output terminal of the inverter is connected to said second input terminal (MP) of the inverter via a respective capacitor ($C_a$, $C_b$, $C_e$). Each one of the multi-state switching cells (MSSC) comprises a separate autotransformer, wherein each separate autotransformer comprises end terminals and an intermediate terminal.

The separate autotransformers used in the multistate switching cell, however, require a relatively large installation space. Additionally, separate autotransformers comprise a relatively large mass and therefore are expensive components.

The document US 2008/094159 A1 as well as its corresponding patent family member EP 1 914 868 A1 disclose a three-phase AC or two-phase DC choke arrangement of a frequency converter, comprising: a magnetic core with a plurality of phase specific pillars having phase specific windings wound there-around or a plurality of branch specific pillars having branch specific windings wound there-around. The phase-specific windings of the AC choke arrangement or the branch-specific windings of the DC choke arrangement are adapted to filter differential mode currents. The choke arrangement comprises an additional pillar without the phase-specific or branch-specific windings fitted around it and arranged in the magnetic core for damping common-mode currents. The common mode currents are damped by means of a common-mode impedance formed by the additional pillar and the windings arranged around the phase-specific or branch-specific pillars.

The article "Integrated Inductor for Interleaved Operation of Two Parallel Three-phase Voltage Source Converters" by G. Gohil et al. discloses an inductor assembly for two interleaved Voltage Source Converters. The disclosed inductor assembly is able to combine both line filter and circulating currents filter functionality within one magnetic structure. The magnetic core is composed of three phase legs, a common leg and three bridge legs between the phase legs. Each phase leg comprises two inductor coils each one corresponding to a different one of the two voltage source converters. A high permeability material is used for the phase legs and the common leg, whereas the bridge legs are realized using a laminated iron core. An air gap has been inserted in each of the bridge legs.

The construction of the inductor assembly is relatively complex and comprises different magnetic materials within the core. The total mass of the inductor assembly as well as its respective installation space is still relatively large. This might cause disadvantageous impacts with regards to manufacturability and material costs.

SUMMARY

In light of the above, the disclosure is directed to a compact and cost effective inductor assembly capable of filtering the output current of a switch mode power supply, for example, a high current/high efficient DC/AC-converter, with n phase terminals and two parallel half-bridges per phase while attenuating circulating currents between the parallel half-bridges. The disclosure is also directed to a compact and cost effective inductor assembly capable of use in a switch mode power supply, for example, a high current/high efficient DC/DC converter with multiple switching paths connected in parallel to each other that comprises a minimized voltage ripple at its output.

An inductor assembly according to this disclosure comprises a magnetic core with a center leg and a number n of phase legs, wherein n is an integer and n>1. Each phase leg is magnetically connected to the center leg by an upper bridge and a lower bridge to form a magnetic main loop, a midpoint of the phase leg being magnetically connected to a center point of the center leg by a shunt element comprising a gap. Each phase leg further comprises an upper inductor coil disposed on an upper phase leg section located between the midpoint and the upper bridge and a lower inductor coil disposed on a lower phase leg section located between the midpoint and the lower bridge.

Alternatively, and instead of disposing the upper inductor coil on an upper phase leg section and the lower inductor coil on a lower phase leg section, each phase leg further comprises an upper inductor coil disposed on the upper bridge and a lower inductor coil disposed on the lower bridge. The upper inductor coil comprises a first terminal and a second terminal and the lower inductor coil comprises a third terminal and a fourth terminal. The second terminal of the upper inductor coil and the third terminal of the lower inductor coil are connected to each other in order to form a series connection of the upper inductor coil and the lower inductor coil of the respective phase leg. A winding direction of the upper inductor coil relative to a winding direction of the lower inductor coil is such that a current flowing from the first terminal of the upper inductor coil to the fourth terminal of the lower inductor coil generates a magnetic flux for each one of the upper inductor coil and the lower inductor coil that are superposing constructively within the respective phase leg. Accordingly, the winding direction of the upper inductor coil starting from its first terminal and directed to its second terminal is equal to the winding direction of the lower inductor coil starting from its third terminal and directed to its fourth terminal. In other words, the upper inductor coil comprises the same winding direction as the lower inductor coil on their respective phase leg, under the precondition that the first and the third terminal act as starting terminals, whereas the second and the fourth terminal act as end terminals of the respective inductor coils.

Accordingly, each inductor coil may create a magnetic flux in the magnetic main loop formed by the phase leg, the center leg and the upper and lower bridge, or in the respective upper or lower magnetic subloop, respectively, formed by the upper/lower bridge, the upper/lower phase leg section and an upper/lower center leg section, both subloops being closed by the shunt element. The gap of the shunt element provides flux stabilization and linearization, together with an additional magnetic resistance for the upper and lower subloops.

A current flowing from the first terminal of the upper inductor coil to the fourth terminal of the lower inductor coil generates a magnetic flux for each one of the upper inductor coil and the lower inductor coil. The winding direction of the upper inductor relative to the lower inductor coil is such that the two magnetic fluxes comprise an equal direction relative to each other and therefore superpose constructively in the respective phase leg. That constructive superposition in particular takes place in an upper and in a lower phase leg section as well as in the upper and the lower bridge of the respective phase leg.

If in another case a first current $I_1$ flows from the second terminal of the upper inductor coil to the first terminal of the upper inductor coil and a second current $I_2$ flows from the third terminal of the lower inductor coil to the fourth terminal of the lower inductor coil, magnetic fluxes are generated by the respective currents $I_1$, $I_2$ which magnetic fluxes comprise an opposite direction in the respective phase leg. Therefore, both magnetic fluxes superpose destructively. That destructive superposition in particular also takes place in an upper and in a lower phase leg section as well as in the upper and the lower bridge of the respective phase leg. In contrary to the above mentioned core elements, both magnetic fluxes superpose constructively in the shunt element. This situation which schematically is shown and described in more detail in FIG. 1d leads to a characteristic feature of the inductor assembly, namely that a change of a given current difference $I_1-I_2$ always results in a change of the magnetic net flux resulting from the superposition of both magnetic fluxes. That change of the magnetic net flux within the respective phase leg counteracts a force driving that current difference and therefore acts as a stabilizing element for an existing current difference $I_1-I_2$. In other words a given or an existing current difference is stabilized via the magnetic coupling of the upper inductor coil and the lower inductor coil disposed on the same phase leg, while the change of an existing current difference $I_1-I_2$ is counteracted and therefore choked by that magnetic coupling.

The inductor assembly according to the disclosure comprises in total three points where magnetic fluxes are merging. These three points are in particular: an upper part of the upper section of the center leg at which magnetic fluxes out of the upper magnetic sub-loops and the magnetic main loops of the different phase legs are merging, a bottom part of the lower section of the center leg at which magnetic fluxes out of the lower magnetic sub-loops and the magnetic main loops of the different phase legs are merging, and a center point of the center leg at which magnetic fluxes out of the upper magnetic sub-loops and the lower magnetic sub-loops of the different phase legs are merging.

Within the expressions "upper inductor coil" and "lower inductor coil" the adjectives "upper" and "lower" are only used for distinguishing the two inductor coils within the inductor assembly. These adjectives do not limit the disclosure to a certain spatial arrangement or orientation of the inductor assembly, which limiting would eventually exclude a horizontal orientation of the inductor assembly in its application. The same is also valid for the expressions "upper magnetic sub-loop" and "lower magnetic sub-loop".

In one embodiment, also the flux in the magnetic main loop is stabilized by an upper gap arranged in the upper phase leg section and/or a lower gap arranged in the lower phase leg section. The gap comprised in the shunt element, the upper gap and the lower gap may each individually be selected from an air gap and a gap fully filled with or partially comprising a dielectric material such as plastics, ceramics or the like. The width of the upper and lower gap may be chosen to be equal. Additionally each gap can support a measurement of the magnetic flux that is present at its respective location. In particular, a magnetic sensor can be placed near the respective gap and can detect the magnetic stray flux coming out of that particular gap. Since the stray flux always is a measure of the local magnetic flux distribution within the respective core section, the relevant magnetic flux at that core section can be deduced out of the stray flux measurement.

In one implementation of the disclosure, the width of the gap comprised in the shunt element is larger than the width of the upper and/or lower gap. In one embodiment, the width of the gap comprised in the shunt element is at least five times larger than the width of the upper and/or the lower gap of that respective phase leg in order to provide sufficient difference in the magnetic resistance of the main loop compared to the magnetic resistances of the subloops. In each case the gap width of the upper gap and/or the lower gap are chosen in order to sufficiently suppress a saturation magnetization within the main loop during the operation of the inductor assembly. In one embodiment the gap width of the shunt element is chosen in order to sufficiently suppress a saturation magnetization of the upper and the lower subloops during the operation of the inductor assembly. Furthermore, the gap comprised in the shunt element may advantageously be disposed adjacent to the center leg or adjacent to the phase leg.

The windings of the inductor coils may be configured as wire-based windings or foil-based windings, and may be wound around a bobbin. In one embodiment the number of windings of the upper inductor coil is substantially equal to that of the lower inductor coil. In one embodiment, each one of the plurality of upper inductor coils and lower inductor coils comprise the same inductor coil type, for instance a wire-based or a foil-based coil type. In another embodiment each of the plurality of upper and lower inductor coils comprise substantially the same winding number.

In an implementation of the disclosure, n is equal to three, i.e. the inductor assembly comprises three phase legs. The phase legs may be circumferentially arranged around the center leg, in particular at an angle of 120° between each of the phase legs. In an alternative embodiment of the disclosure n is equal to two, which means the inductor assembly comprises two phase legs, opposing each other in one embodiment. Here the phase legs are circumferentially arranged around the center leg at an angle of 180° between each of the phase legs. According to a more general construction guideline, one embodiment of the disclosure with n phase legs comprises a circumferential arrangement of the phase legs around the center leg at an angle of 360°/n between each of neighboring phase legs.

To simplify assembly of the inductor arrangement, the magnetic core may be formed from a plurality of core elements. The number and shape of the core elements is selected such that the inductor coils may be placed onto core elements forming corresponding phase leg sections and/or upper bridges and lower bridges prior to assembly. Subsequently, the core elements are put together to form the inductor assembly according to the disclosure. The possibility that the gap comprised in the shunt element may be disposed adjacent to the center leg or adjacent to the phase leg offers different options regarding number and geometry of the core elements. The different options can be assessed with regard to their manufacturing and assembling capability and the best option for an individual inductor assembly can be chosen in each case.

In one embodiment, the center leg comprises no gap, at least no significant gap. Within the center leg the magnetic fluxes of the several phase legs superpose. When using the inductor assembly in a two phase or three phase power supply system the magnetic fluxes coming out of the phase legs might per-se often superpose destructively within the center leg due to an existing phase difference of AC voltages and resulting currents within the multiple phases of a common utility grid. This, for instance, is the case with respect to a three phase utility grid in that the AC voltages of each phase comprise a phase shift of 120°. This for instance is also the case for a two phase utility grid, in which the two phases comprise a phase shift of 180° relative to each other, like it is in a so-called split-phase system. Therefore, there is no need to further reduce the magnetic flux within the center leg by introducing a significant gap into it. In this context a significant gap is a gap intended for magnetic reasons, for instance in order to provide a magnetic resistance and to suppress a magnetic saturation. A non-significant gap in this context is a gap intended or necessary to simplify or even permit an assembly of the inductor assembly out of different core elements. The gap width of a non-significant gap is typically small compared to the significant gap and typically range up to 500 µm. Accordingly, within the scope of the disclosure a significant gap is larger than 500 µm.

A power supply system according to the disclosure in one embodiment is configured to operate as a DC/AC-converter. Here the inductor assembly according to the disclosure is used as an output filter or at least part of an output filter of the power supply system. The power supply system further comprises: a DC-link, a number n of phase terminals at an output of the power supply system, wherein each one of the n phase terminals are connected to a corresponding first half-bridge and a corresponding second half-bridge of the DC/AC-converter. A control unit is configured to control the corresponding second half-bridge for each phase terminal in an interleaved manner relative to the corresponding first half-bridge of the respective phase terminal. The power supply system further comprises an output filter comprising the inductor assembly according to the disclosure.

Each phase terminal of the power supply system is associated with a different corresponding phase leg of the inductor assembly and connected to an output of its corresponding first half-bridge via an upper inductor coil of the corresponding phase leg. Each phase terminal is further connected to an output of the corresponding second half-bridge via a lower inductor coil of the corresponding phase leg. For each phase terminal the corresponding first half-bridge and the corresponding second half-bridge are connected with their respective input sides to the DC-link in parallel. For each phase leg of the inductor assembly the upper inductor coil is connected with its first terminal to the output of the corresponding first half-bridge and the lower inductor coil is connected with its fourth terminal to the output of the corresponding second half-bridge. For each phase leg of the inductor assembly the second terminal of the upper inductor coil and the third terminal of the lower inductor coil are both connected to the respective phase terminal.

The DC/AC-converter according to the disclosure is a power supply system capable of supplying high output currents. The high output current for each phase terminal is achieved by a concurrent current supply via the corresponding first and second half-bridge that are connected in parallel with their outputs to the respective phase terminal. An interleaved operation of the first half-bridges relative to the second half-bridges of each phase terminal minimizes the voltage ripple at an output—in particular at an output capacity—of the power supply system.

The inductor assembly according to the disclosure is used as an output filter and reduces or attenuates circulating currents between the first half-bridges and their corresponding second half-bridges. Due to the attenuation of circulating currents between the corresponding half-bridges the power losses with respect to these circulating currents are reduced and the efficiency of the power supply system as a whole is increased.

The attenuation of the circulating currents between the corresponding first and the second half-bridges is achieved by the magnetic coupling of the inductor assembly in combination with the circuit topology described above. In this case for each phase leg the winding orientation of the upper inductor coil relative to the corresponding lower inductor coil is such that a current flowing from the output of the first half-bridge through the upper inductor coil to a certain phase terminal and an equal current flowing from the output of the corresponding second half-bridge through the lower inductor coil to the same phase terminal are generating magnetic fluxes in their corresponding phase leg that are substantially compensating each other. In other words, in case of equal currents flowing from the first half-bridge and the corresponding second half-bridge in direction to the same phase terminal, the respective magnetic fluxes in the corresponding phase leg superimpose destructively. On the other hand, in case of a current flowing from the first half-bridge through the series connection of the upper inductor coil and the lower inductor coil to the second half-bridge the generated magnetic fluxes in the respective phase leg superimpose constructively. That current typically is driven by a voltage difference between the outputs of the first half-bridge and its corresponding second half-bridge. Therefore, a change of that current or—in other words—a change of the difference between the output currents of the first and its corresponding second half-bridge is counteracted by a change of the resulting magnetic flux in the respective phase leg of the inductor assembly.

These features of the inductor assembly in combination with the interleaved clocking of the first half-bridge relative to the second half-bridge lead to the desired attenuation of circulating currents and increases the efficiency of the DC/AC-converter as an example of the power supply system.

An interleaved clocking of the second half-bridge relative to the first half-bridge means a clocking of the first and second half-bridge with substantially the same clocking frequency, but with timely shifted clocking signals for a fast switching switch—or optionally a plurality of fast switching switches—of the second and the first half-bridges. In particular, mid points of "on" cycles for fast switching switches of the second-half-bridge and the first half-bridge are phase shifted relative to each other. The phase shift is equivalent to a corresponding time shift of the respective clocking signals. Apart from that phase shift or time shift the clocking signals for the first half-bridge and its corresponding second half-bridge are substantially equal regarding their "on" and "off" periods. Therefore, also mid points of "off" cycles for respective fast switching switches of the second half-bridge and the corresponding first half-bridge comprise the same phase shift relative to each other as it is the case for the "on" cycles.

In one embodiment of the disclosure the phase shift is controlled by the control unit to be substantially 180°. Here and in the following the adverb "substantially" considers the fact that a phase shift of exactly 180°—or any other exact phase shift value—between the respective switches is hard to achieve and hard to keep constant during a longer time period and therefore is equivalent to a tolerance range of ±5°. By purposefully designing the gap widths in order to suppress a magnetic saturation of the magnetic core the inductor assembly of the disclosure also sufficiently operates with an interleaved clocking that deviates within larger tolerances from the 180° phase shift. However, a deviation from the 180° phase shift typically increases a voltage ripple on an output capacity of the power supply. In case a somewhat larger voltage ripple is tolerable the interleaved clocking can comprises a phase shift in the range of 180°±30°.

In one embodiment, each one of the plurality of half-bridges, i. e. each one of the plurality of first and second half-bridges, comprises a topology with a single upper switch and a single lower switch. In an alternative embodiment, each one of the plurality of half-bridges, i. e. each one of the plurality of first and second half-bridges, comprises a topology with two high-side switches connected in series controlled in a substantially synchronous manner and two low-side switches connected in series controlled in a substantially synchronous manner by the control unit, wherein in one embodiment the expression "substantially synchronous manner" is equivalent to a phase difference of 0° with a tolerance of ±5°. The alternative embodiment typically corresponds to a design of the half-bridges that is capable to operate with a large DC-voltage present at the DC-link.

The circuit topology of each one of the plurality of half-bridges, i. e. each one of the plurality of first and second half-bridges, may comprise one of a two level topology, a three level topology, a four level topology, a five level topology, a seven level topology, a nine level topology or a topology with even more than nine levels. Additionally, the circuit topology of each one of the plurality of half-bridges, i. e. each one of the plurality of first and second half-bridges, can comprise any commonly known circuit topology comprising or not comprising a connection to an intermediate voltage level of the DC-link. With regard to the circuit topologies comprising that connection to an intermediate voltage level the circuit topology for instance may be one of: a Neutral-Point-Clamped (NPC) and a Bipolar-Switched-Neutral-Point-Clamped (BSNPC) topology.

In one embodiment, all half-bridges, in particular all first and second half-bridges of the inductor assembly, are of the same topology.

In one embodiment, the DC/AC-converter as example of the switch mode power supply system according to the disclosure comprises multiple phase terminals with or without a neutral terminal at its output. In one embodiment the DC/AC-converter comprises two phase terminals and a neutral terminal or—in alternative embodiments—three, four, or even more phase terminals and a neutral terminal at its output.

In another embodiment, a power supply system according to the disclosure comprises a DC/DC-converter, for instance a boost converter, comprising the inductor assembly according to the disclosure. In that embodiment the power supply system configured to operate as a DC/DC-converter comprises: an input for receiving an input voltage $V_{in}$, an output for supplying an output voltage $V_{out}$, and a number of n switching cells connected in parallel to the output. Further, each one of the n switching cells comprises a first and a second switching path connected in parallel to each other, wherein each switching path comprises a series connection of a first semiconductor switch and a second semiconductor switch, and an interconnection point between them. The power supply system further comprises a control unit configured to control the first semiconductor switch of the first switching path in an interleaved manner relative to the first semiconductor switch of the second switching path. The power supply system further comprises an inductor assembly according to the disclosure connecting each one of the n switching cells to the input. Each one of the n switching cells is associated to a different corresponding phase leg of the inductor assembly and connected to the input via the upper inductor coil and the lower inductor coil of that corresponding phase leg, such that for each one of the n switching cells, and the interconnection point of the first switching path is connected to the first terminal of the upper inductor coil and the interconnection point of the second switching path is connected to the fourth terminal of the lower inductor coil. The second terminal of the upper inductor coil and the third terminal of the lower inductor coil are both connected to the input.

In a further embodiment, a power supply system according to the disclosure comprises a DC/DC-converter, for instance a buck converter, comprising the inductor assembly according to the disclosure. In this embodiment the power supply system configured to operate as a DC/DC-converter comprises: an input for receiving an input voltage $V_{in}$, an output for supplying an output voltage $V_{out}$, and a number of n switching cells connected in parallel to the input. Each one of the n switching cells comprises a first and a second switching path connected in parallel to each other, wherein each switching path comprises a series connection of a first semiconductor switch and a second semiconductor switch and an interconnection point between them. The power supply system further comprises a control unit, configured to control the first semiconductor switch of the first switching path in an interleaved manner relative to the first semiconductor switch of the second switching path. The power supply system further comprises an inductor assembly according to the disclosure connecting each one of the n switching cells to the output, wherein each one of the n switching cells is associated to a different corresponding phase leg of the inductor assembly and connected to the output via the upper inductor coil and the lower inductor coil of that corresponding phase leg, such that for each one of the n switching cells, the interconnection point of the first switching path is connected to the first terminal of the upper inductor coil and the interconnection point of the second switching path is connected to the fourth terminal of the lower inductor coil, and wherein the second terminal of the upper inductor coil and the third terminal of the lower inductor coil are both connected to the output.

Also in case of the DC/DC converter as example of the power supply system, an interleaved clocking of the first semiconductor switch of the first switching path relative to the first semiconductor switch of the second switching path means a clocking of the first semiconductor switches with substantially the same clocking frequency but with timely shifted clocking signals. In particular, mid points of "on" cycles for the first semiconductor switch of the first switching path and the first semiconductor switch of the second switching path are phase shifted relative to each other. The phase shift is equivalent to a corresponding time shift of the respective clocking signals. Apart from that phase shift or time shift, the clocking signals for the first semiconductor switches of the first and the second switching path are substantially equal regarding their "on" and "off" periods. Therefore, also mid points of "off" cycles for the first semiconductor switches of the first and the second switching path comprise the same phase shift relative to each other as it is the case for the "on" cycles.

In one embodiment, the phase shift between the first semiconductor switches of the first and the second switching path is controlled by the control unit to be substantially 180°. Also, in one embodiment, the adverb substantially is equivalent to a tolerance range of about ±5°. A deviation from the 180° phase shift typically increases a voltage ripple of an output capacity of the power supply. However, in case a larger voltage ripple is tolerable the interleaved clocking can comprise a phase shift in the range of 180°±30°.

In one embodiment of the power supply system comprising a DC/DC-converter, the voltage ripple of the output is further reduced. Here the power supply system comprising a DC/DC converter contains two or optionally three switching cells, and the first semiconductor switches of each switching cell are controlled by the control unit with substantially the same clocking frequency. The first semiconductor switches associated with the same switching cell are clocked in an interleaved manner comprising a phase shift of substantially 180° relative to each other, wherein an arbitrary first semiconductor switch associated with a first switching cell is clocked in an interleaved manner relative to an arbitrary first semiconductor switch of a second switching cell comprising a phase shift of substantially 180°/n or 180°+180°/n, wherein n=2 or n=3. This leads to a uniform distribution of the phase shifts of all first semiconductor switches and therefore minimizes the ripple of an output voltage $V_{out}$ of the power supply system. Within the scope of the disclosure the adverb "substantially" again is equivalent to a tolerance range of ±5° of the value mentioned behind the adverb "substantially".

Advantageous developments of the disclosure result from the claims, the description and the drawings. The advantages of features and of combinations of a plurality of features mentioned at the beginning of the description only serve as examples and may be used alternatively or cumulatively without the necessity of embodiments according to the disclosure having to obtain these advantages. Without changing the scope of protection as defined by the enclosed claims, the following applies with respect to the disclosure of the original application and the patent: further features may be taken from the drawings, in particular from the illustrated designs and the dimensions of a plurality of components with respect to one another as well as from their relative arrangement and their operative connection. The combination of features of different embodiments of the disclosure or of features of different claims independent of the chosen references of the claims is also possible, and it is motivated herewith. This also relates to features which are illustrated in separate drawings, or which are mentioned when describing them. These features may also be combined with features of different claims. Furthermore, it is possible that further embodiments of the disclosure do not have the features mentioned in the claims.

The number of the features mentioned in the claims and in the description is to be understood to cover this exact number and a greater number than the mentioned number without having to explicitly use the adverb "at least". For example, if a phase leg is mentioned, this is to be understood such that there is exactly one phase leg or there are two phase legs or more phase legs.

BRIEF DESCRIPTION OF THE DRAWINGS

In the following, the disclosure is further explained and described with respect to preferred exemplary embodiments illustrated in the drawings for which FIG. 3b shows a timing diagram of voltage values present at the outputs of two corresponding half-bridges during their interleaved operation for the DC/AC-converter according to FIG. 2, FIG. 3c shows a timing diagram of voltage values present at an interconnection point between an upper inductor coil and a lower inductor coil of a corresponding phase terminal during their interleaved operation for the DC/AC-converter according to FIG. 2, FIG. 5a shows a boost converter as example for a power supply system containing an inductor assembly according to this disclosure.

DETAILED DESCRIPTION

The disclosure relates to an inductor assembly and a power supply system comprising such an inductor assembly. In particular, the inductor assembly can be used as part of an output filter of a multiphase DC/AC-converter capable of supplying high output currents and comprising two parallel half-bridges per phase terminal that are operated in an interleaved manner to each other. In addition, the inductor assembly can be used in a DC/DC converter capable of supplying high output currents comprising multiple parallel connected switching paths operated in an interleaved manner to each other.

Figure 1B:
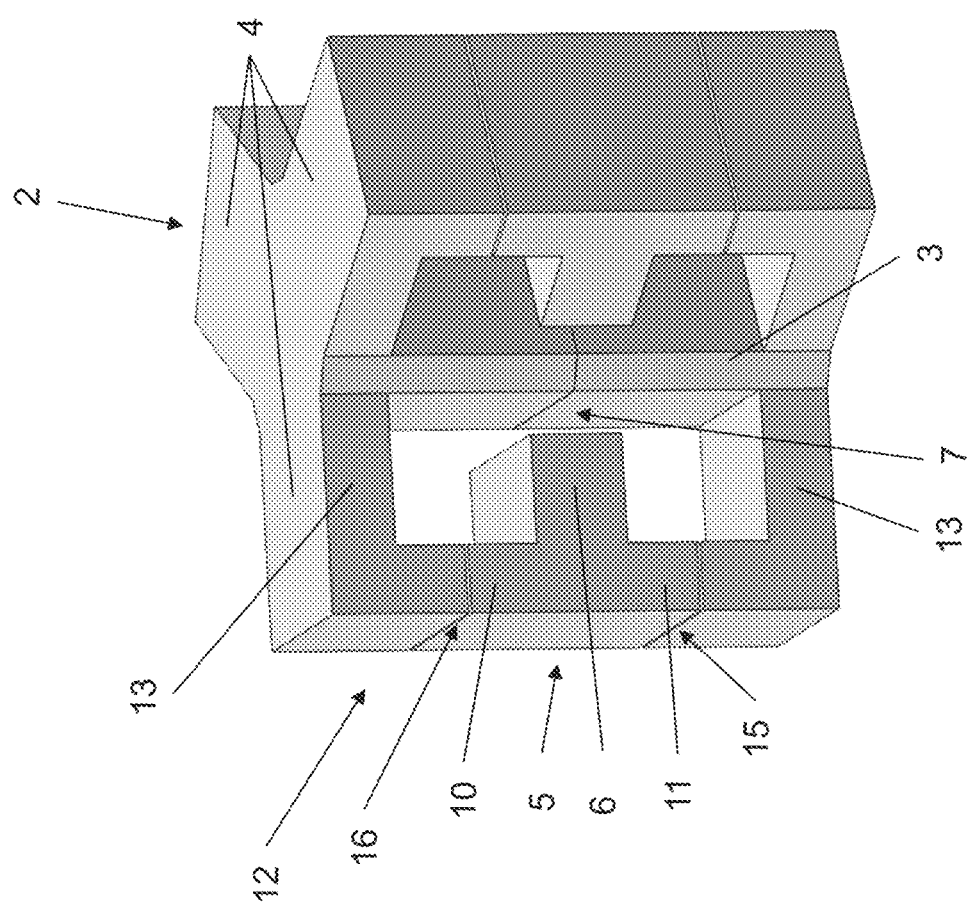
FIG. 1b shows a perspective view of a magnetic core of the inductor assembly of FIG. 1a, FIG. 1c shows a section of an alternative embodiment of the inductor assembly according to this disclosure.

FIG. 1a shows an inductor assembly 1 comprising a magnetic core 2 and overall six inductor coils 8, 9. The same magnetic core 2 is shown in FIG. 1b without the inductor coils 8, 9. The magnetic core 2 comprises three phase legs 4, arranged circumferentially around a center leg 3 such that each phase leg 4 comprises an angle of 360°/3=120° to a neighboring phase leg 4. In case of n phase legs 4 that angle is, in one embodiment, chosen to be 360°/n for reasons of symmetry. On each phase leg 4, an upper inductor coil 8 and a lower inductor coil 9 is disposed such that a main phase loop is formed passing through both inductor coils, the main loop comprising the corresponding phase leg 4, the center leg 3 and an upper and a lower bridge 13 magnetically connecting the center leg 3 to the phase leg 4. Between the upper inductor coil 8 and the lower inductor coil 9, a shunt element 6 is arranged, extending from a midpoint 5 of the phase leg 4 to a center point of the center leg 3. Accordingly, two subloops are formed by the shunt element 6, each subloop passing through one of the inductor coils 8, 9, and comprising the shunt element 6, a corresponding phase leg section 10, 11, the upper or the lower bridge 13 and a corresponding upper or a lower section of the center leg 3.

The shunt element 6 comprises a gap 7 arranged adjacent to the center leg 3. Alternatively, the gap may also be arranged adjacent to the phase leg 4. The shunt element 6 and the phase leg 4 may be formed as a single piece, or the shunt element 6 and the center leg 3 may be formed as a single piece, or as separate or separable elements. The gap 7 helps to stabilize the magnetic flux in the subloops and provides a predetermined magnetic resistance to the flux in order to suppress a saturation of the magnetic core 2 during an operation of the inductor assembly 1.

Optionally, further gaps 15, 16 may be arranged in one or both of the phase leg sections 10, 11, for example, within a location that is encompassed by the inductor coils 8, 9. These further gaps 15, 16 may have a width significantly smaller than a width of the gap 7, thereby providing less magnetic resistance to the main loop as compared to the subloops.

In one implementation, the magnetic core 2 is formed by a plurality of core elements in an assembled state. Various combinations of shape and number of core elements may be contemplated, wherein it is advantageous to select an element shape such that, prior to assembly, the inductor coils 8, 9 may be placed at their target position at the core element forming the corresponding phase leg section 10, 11 in the assembled state. In FIG. 1b, the magnetic core 2 is formed from two main elements jointly forming the center leg 3, and a T-shaped extra element per phase leg 4, each extra element comprising the shunt element 6 and forming the corresponding phase leg 4 in combination with the main elements.

The center leg 3 comprises no, at least no significant gap. Furthermore and in one embodiment the connection of the inductor assembly to outer circuit elements is chosen such that during operation of the inductor assembly 1 the magnetic fluxes of the several phase legs 4 superpose destructively in the center leg 3. Due to that destructive superposition the center leg 3 can be designed relatively slim and no additional gap in order to further reduce the magnetic flux inside the center leg 3 is necessary. It is furthermore not desired in one embodiment. The slim configuration of the center leg 3 also provides a compact design of the inductor assembly 1 as a whole.

Each upper inductor coil 8 comprises a first terminal 20 and a second terminal 21, whereas each lower inductor coil comprises a third terminal 22 and a fourth terminal 23. The second terminal 21 of the upper inductor coil and the third terminal of the lower inductor coil are connected to each other in order to form a series connection of the upper inductor coil 8 and the lower inductor coil 9 on each phase leg 4. The remaining first terminals 20 of the upper inductor coils 8 and the fourth terminals 23 of the lower inductor coils 9 can be connected to outer circuit elements.

The arrangement of the upper and the lower inductor coils 8, 9 together with the shunt element 6 provides an optimized guidance of the magnetic stray flux and leakage fluxes and a magnetic stray flux to an outer environment of the inductor assembly is reduced.

Figure 1C:
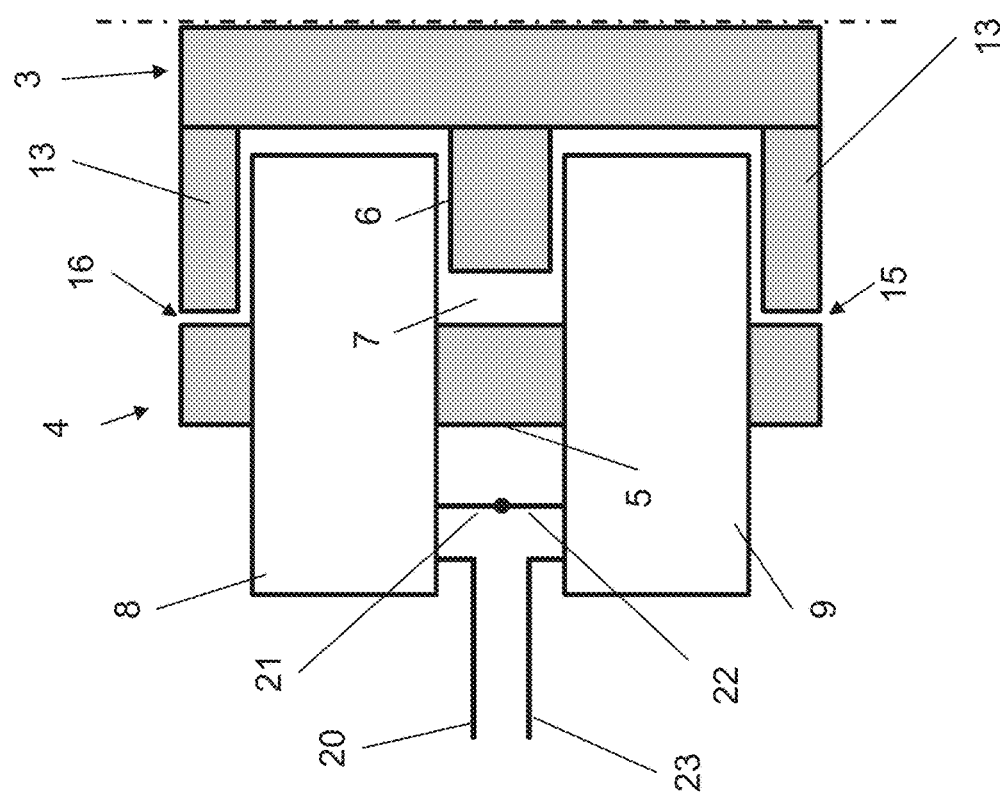
FIG. 1a shows a perspective view of an inductor assembly according to this disclosure.
FIG. 1d illustrates a respective magnetic flux distribution for a section of an inductor assembly according to this disclosure with regard to particular current distribution.
FIG. 1e illustrates a respective magnetic flux distribution for a section of an inductor assembly according to this disclosure with regard to a different current distribution compared to the current distribution shown in FIG. 1d.
FIG. 1f shows a perspective view of an alternative inductor assembly according to this disclosure.

FIG. 1c schematically illustrates a phase leg section 4 of an alternative embodiment of the disclosure. In a difference to the embodiment shown in FIG. 1a and FIG. 1b the gap 7 is located near the phase leg 4. The phase leg 4 comprises an "I" element on which the upper inductor coil 8 and the lower inductor coil 9 are disposed. The gaps 15 and 16 are located on either side ends of the "I" element. Alternatively, the gaps 15 and 16 can be located on front ends of the "I" element. The upper and lower bridges 13, the shunt element 6 and the center leg 3 can either be formed of a single piece or of separate elements.

The inductor assembly 1 can be as a whole or at least partly encompassed by a metallic housing (not shown). The metallic housing comprising the inductor assembly 1 can be filled with an electrically insulating potting material.

Figure 1D:
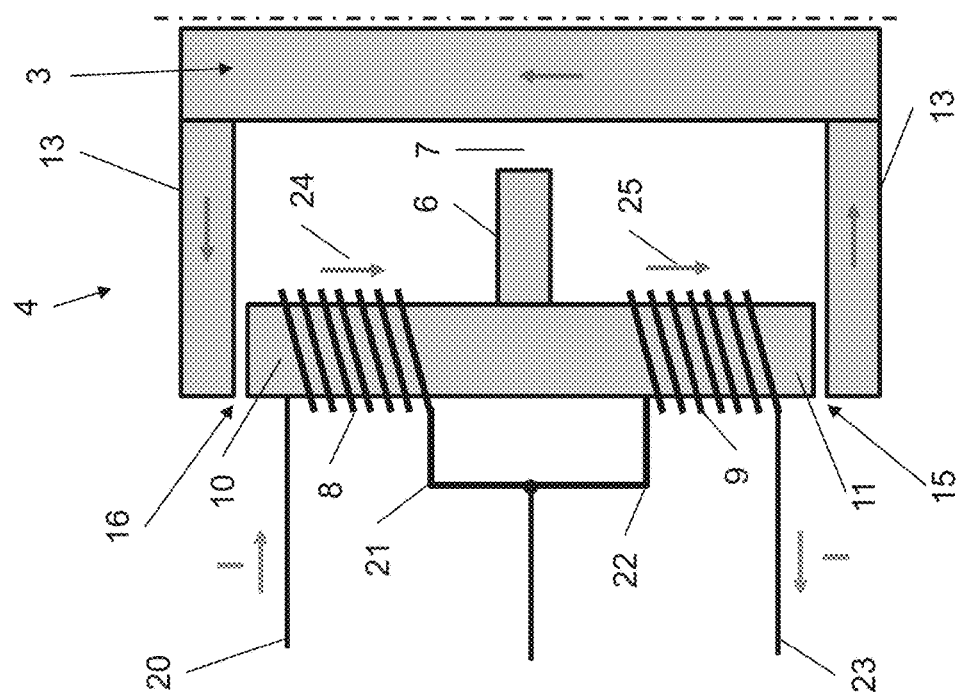

FIG. 1d schematically illustrates a magnetic flux distribution for a phase leg section 4 of the inductor assembly 1 shown in FIG. 1a. In the illustrated embodiment, the upper inductor coil 8 and the lower inductor coil 9 comprise substantially the same coil type, for instance a foil-based coil type, and the same winding number. The second terminal 21 of the upper inductor coil 8 and the third terminal 22 of the lower inductor coil 9 are electrically connected to form a series connection of the upper and the lower inductor coil 8, 9. A current I is flowing from the first terminal 20 through the series connection of the upper inductor coil 8 and the lower inductor coil 9 to the fourth terminal 23. This current I generates magnetic fluxes 24, 25 within the phase leg section 4 via each one of the upper and the lower inductor coil 8, 9. Both magnetic fluxes 24, 25 superpose constructively in the phase leg section 4—in particular in an upper section 10 and a lower section 11, and also in the upper and lower bridges 13 of the phase leg section 4. The magnetic loop for the superposition of the magnetic fluxes 24, 25 is closed via the center leg 3.

In the example illustrated in FIG. 1*d*, no current flows from the connection of the second terminal 21 and the third terminal 22 to an outer circuit element. In other words, the current I, which flows from the first terminal 20 into the upper inductor coil 8 also leaves the fourth terminal 23 after passing the lower inductor coil 9. Since the inductivity of the upper and the lower inductor coil are assumed to be equal in the illustrated embodiment, also the magnetic fluxes 24, 25 generated via each one of the upper and the lower inductor coil are equal to each other.

Figure 1E:
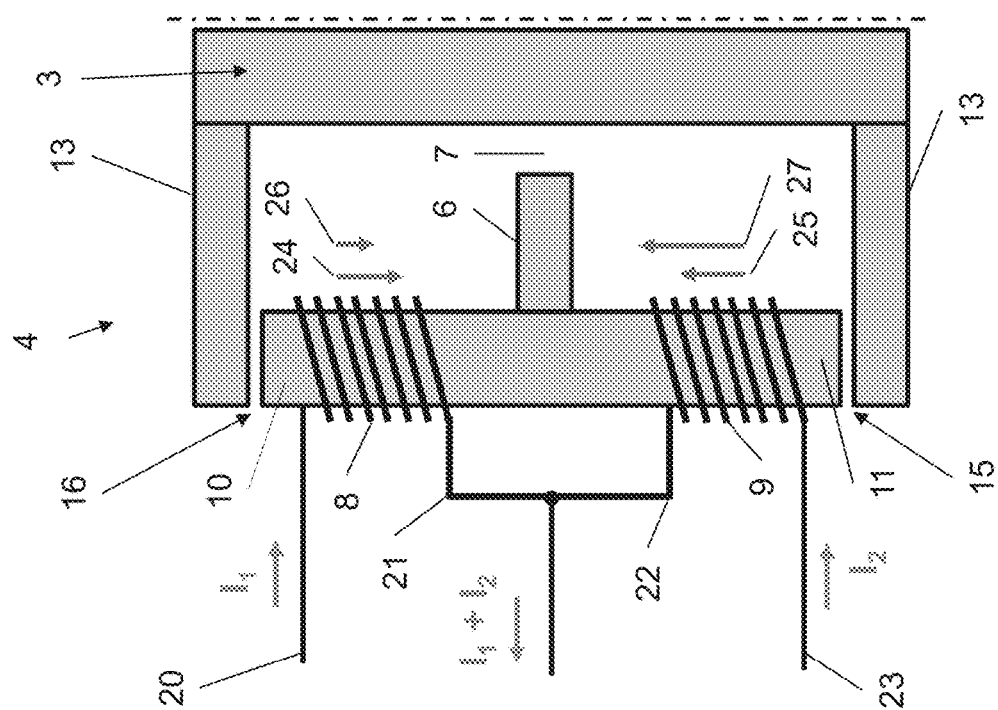

FIG. 1*e* schematically illustrates a distribution of the magnetic fluxes for a phase leg section 4 of the inductor assembly 1 shown in FIG. 1*a*—i. e. the same one which is used for FIG. 1*d*—but with another current distribution. As illustrated, a current $I_1$ flows from the first terminal 20 through the upper inductor coil 8 to the second terminal 21. A second current $I_2$ flows from the fourth terminal 23 through the lower inductor coil 9 to the third terminal 23. The sum of both currents $I_1+I_2$ is flowing out of the connection of the second terminal 21 and the third terminal 22 to an outer circuit element. Here, the current $I_1$ generates a magnetic flux 24 via the upper inductor coil 8 and the current $I_2$ generates a magnetic flux 25 via the lower inductor coil 9. In this current situation both magnetic fluxes 24, 25 superpose destructively inside the phase leg section 4—in particular in an upper section 10 and a lower section 11 and also in the upper and lower bridges 13 of the phase leg section 4. A constructive superposition of both magnetic fluxes 24, 25 takes place within the shunt element 6. However, the large gap 7 between the center leg 3 and the shunt element 6 provides a large magnetic resistance and avoids a magnetic saturation in that case.

Due to assumed identical inductivities of the upper and the lower inductor coil 8, 9 and also identical current amounts ($|I_2|=|I_1|$) the magnetic flux 24 generated via the upper inductor coil 8 and the magnetic flux 25 generated via the lower inductor coil 9 have the same amount and only comprise opposite directions. Therefore, the destructive superposition in this case approximately leads to a cancellation of the resulting magnetic flux ($\Phi=\Phi_1+\Phi_2\approx 0$) in the respective core elements comprising that destructive superposition.

It is now assumed that the currents $I_1$, $I_2$ are different in their amount such that a difference of their amounts does not equal zero. It is further assumed that the current $I_1$ is smaller than the current $I_2$ such that the difference $I_1-I_2$ is negative ($|I_1|-|I_2|<0$). For that case, the magnetic flux 26 generated by the current $I_1$ via the upper inductor coil 8 is smaller in amount than the magnetic flux 27 generated by the current $I_2$ via the lower inductor coil 9. This again leads to a destructive superposition of both magnetic fluxes, but does not lead to cancellation of the resulting magnetic flux ($\Phi=\Phi_1+\Phi_2\neq 0$). This is illustrated via arrows of different length representing the respective magnetic fluxes 26, 27. For that situation a resulting magnetic flux is present within the phase leg 4—in particular in the upper and lower section 10, 11, the upper and the lower bridge 13. That magnetic flux is closed via the center leg 3. Therefore, the distribution of the resulting magnetic fluxes for this case is somewhat similar to the situation illustrated in FIG. 1*d*.

If now the difference of the currents $I_1-I_2$ changes with time d/dt $(I_1-I_2)\neq 0$, also the resulting magnetic flux, which is the superposition of the magnetic fluxes 26, 27 generated via the upper and the lower inductor coil 8, 9, changes with time d/dt ($\Phi=\Phi_1+\Phi_2\neq 0$) and therefore counteracts the force which drives the change in time of that current difference. In other words, an existing current difference $I_1-I_2$ is stabilized via the magnetic coupling provided by the inductor assembly 1, whereas a change in time of that current difference d/dt $(I_1-I_2)$ is counteracted and choked via the magnetic coupling provided by the inductor assembly 1.

Figure 1F:
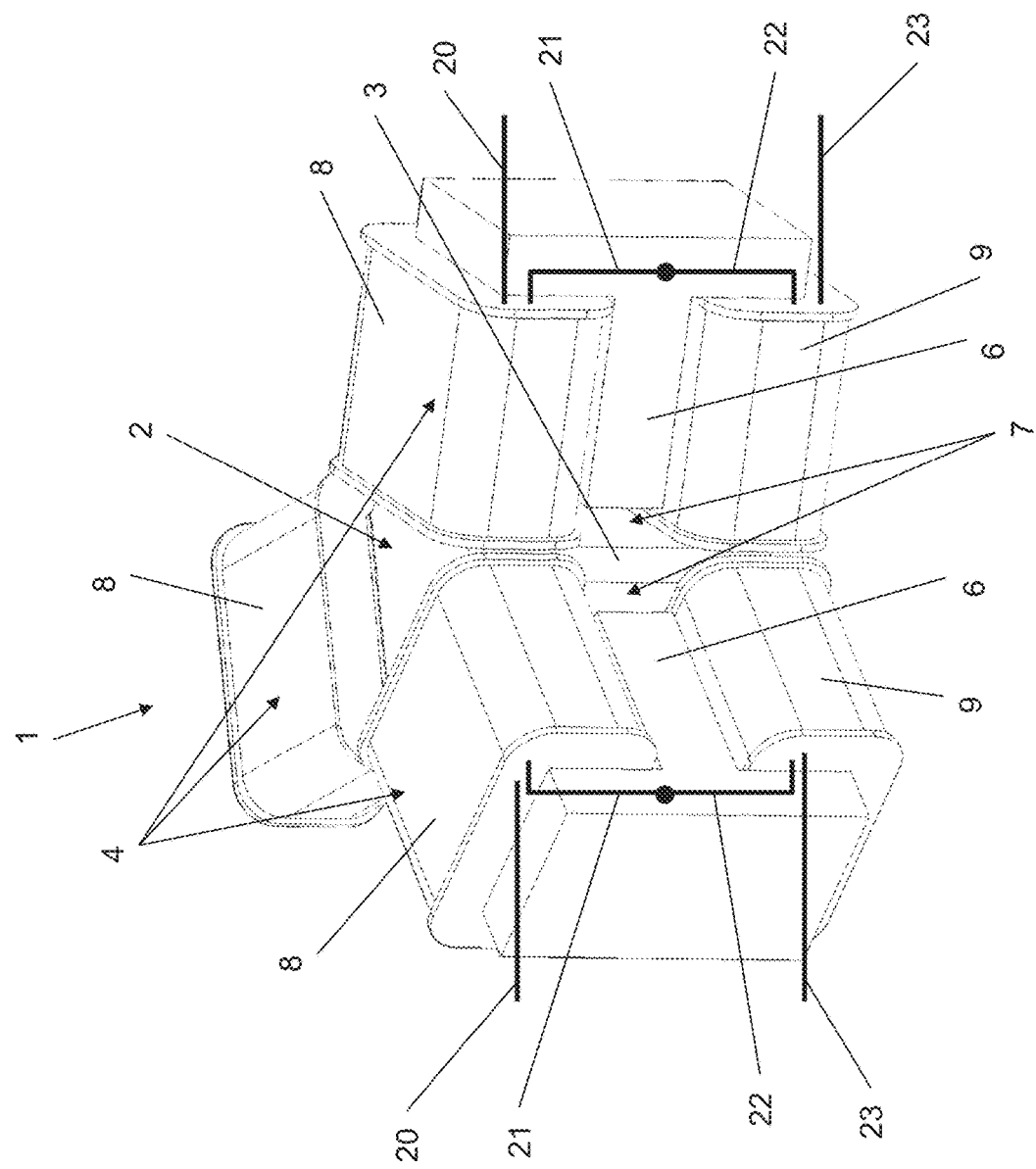

In FIG. 1*f* an alternative embodiment of an inductor assembly according to this disclosure is shown. The embodiment is similar to the one shown in FIG. 1*a* and therefore with regard to the general description of that embodiment it is referred to the description of FIG. 1*a*. In difference to the embodiment of FIG. 1*a*, the embodiment of FIG. 1*f* comprises upper and lower inductor coils 8, 9 for each one of the three phase legs 4 that are disposed on the upper and lower bridges 13 of the respective phase leg 4. The gaps 15 and 16 are also located on the upper and the lower bridges 13 of each phase leg 4. In the illustrated example the gap 7 is located near the center leg 3. However, within the scope of the disclosure it is also possible that the gap 7 is located near the phase leg 4. The first and second terminals 20, 21 of the upper inductor coils 8 as well as the third and fourth terminals 22, 23 of the lower inductor coils—as illustrated in FIG. 1*e*—are shown at particular locations relative to the respective bobbins. These locations are illustrated only by way of example and are not limited to the illustrated case. Furthermore, the locations of the first, second, third and fourth terminals can be chosen in any possible way in order to simplify an assembly process of the inductor assembly 1 and/or in order to lower respective material costs. Same is the case for the other illustrated embodiments of the inductor assembly 1 according to the disclosure. The inductor assemblies 1 as illustrated in FIG. 1*a* and FIG. 1*f* comprise three phase legs 4. This also is only by way of example and not limiting. Within the scope of the disclosure also a number n of two, four or even more phase legs 4 is possible.

Figure 2:
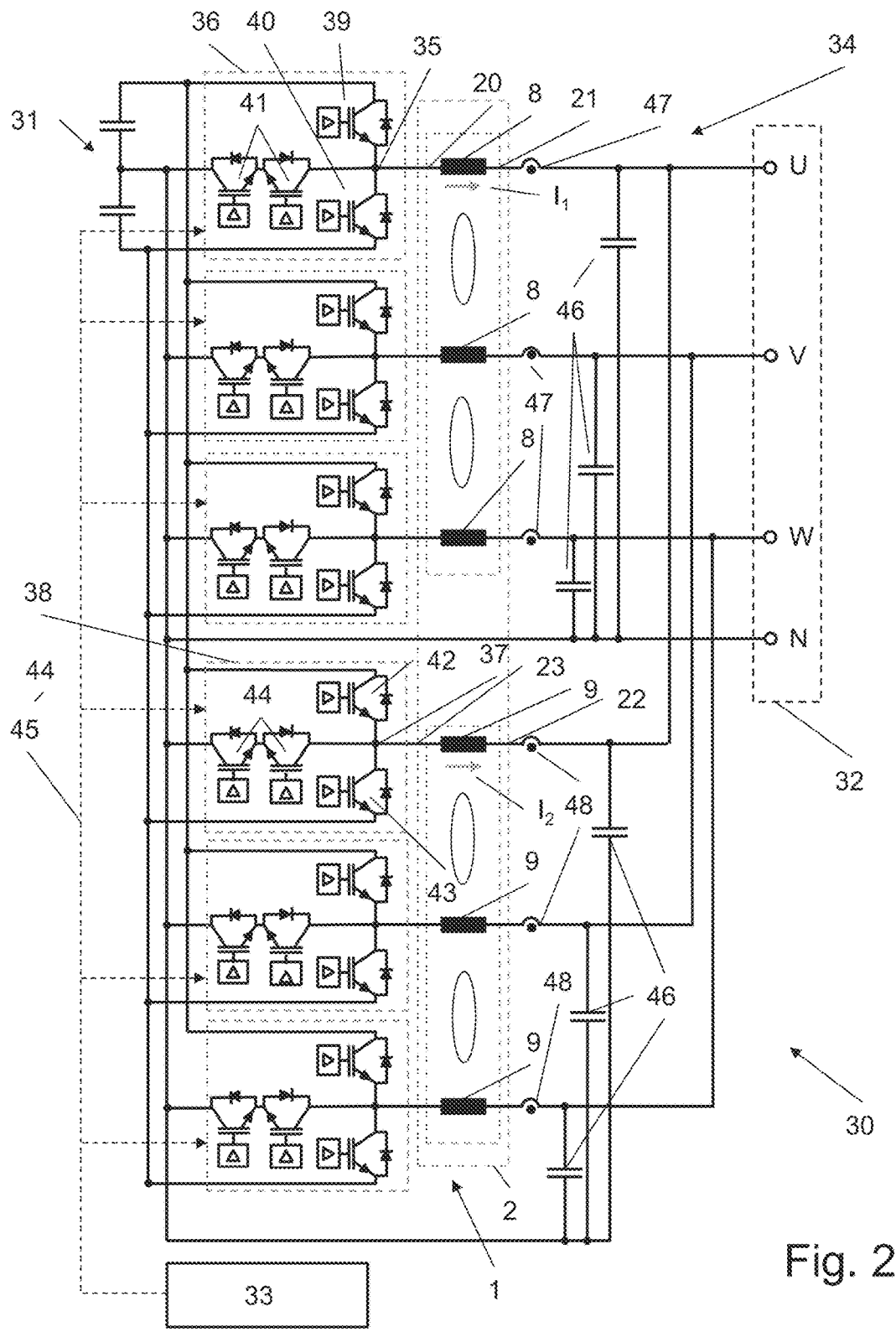
FIG. 2 shows a DC/AC-converter as example for a switch mode power supply system containing an inductor assembly according to this disclosure.

In FIG. 2 a DC/AC-converter as example for a switch mode power supply system 30 according to this disclosure is illustrated. The DC/AC-converter contains the inductor assembly 1 according to this disclosure as an output filter 34 or at least as part of an output filter 34. The DC/AC-converter comprises a DC-link 31 and an output 32 comprising three phase terminals U, V, W and a neutral terminal N. Each phase terminal U, V, W is connected to a corresponding first half-bridge 36 and a corresponding second half-bridge 38. The reference numerals are only illustrated for one of the plurality of first and second half-bridges 36, 38 for clarity reasons. The DC/AC-converter further comprises a control unit 33 configured to control the plurality of first and second half-bridges 36, 38, which control is illustrated in FIG. 2 by a dashed control line 45 interconnecting the control unit 33 to the plurality of first and second half-bridges 36, 38. The control unit 33 is further configured to control the corresponding second half-bridge 38 for each phase terminal U, V, W in an interleaved manner relative to the corresponding first half-bridge 36 of the respective phase terminal U, V, W.

The DC/AC-converter comprises the inductor assembly 1 according to the disclosure as an output filter 34 that connects an output 35 of each first half-bridge 36 and an output 37 of each second half-bridge 38 to the respective phase terminal U, V, W. In detail, each phase terminal U, V, W at an output 32 of the power supply system 30 is associated with a different corresponding phase leg 4 of the inductor assembly 1 and connected to the output 35 of its corresponding first half-bridge 36 via an upper inductor coil of the corresponding phase leg 4. Each phase terminal U, V, W is further connected to an output 37 of the corresponding second half-bridge 38 via a lower inductor coil 9 disposed on the corresponding phase leg 4.

Furthermore, for each phase leg 4 of the inductor assembly 1—or in other words for each phase terminal U, V, W of the output 32—the upper inductor coil 8 is connected with its first terminal 20 to the output 35 of the corresponding first half-bridge 36 and the lower inductor coil 9 is connected with its fourth terminal 23 to the output 37 of the corresponding second half-bridge 38. Furthermore, for each phase leg 4 of the inductor assembly 1 the second terminal 21 of the upper inductor coil 8 and the third terminal 22 of the lower inductor coil 9 are both connected to their respective phase terminal U, V, W. All first and second half-bridges 36, 38 are connected with their respective input sides to the DC-link 31 in parallel. Furthermore, the neutral terminal N is connected to a midpoint of the DC-link 31.

The output filter 34 further comprises filtering capacitors 46 between each phase terminal U, V, W and the neutral terminal N. It is also possible—but not drawn in FIG. 2—that the DC/AC-converter comprises filter capacitors connected between a first phase terminal U, V, W and a different second phase terminal U, V, W for each phase terminal U, V, W.

During operation of the DC/AC-converter each first half-bridge 36 is controlled in an interleaved manner relative to its second half-bridge 38. Advantageously, but not necessarily, that interleaved control comprises a phase shift substantially equal to 180°. Each first half-bridge 36 drives a current $I_1$ from its output 35 through the upper inductor coil 8 to the respective phase terminal U, V, W. Concurrently, each corresponding second half-bridge 38 drives a current $I_2$ through the lower inductor coil 9 to its respective phase terminal. At each respective phase terminal U, V, W—aside from eventually present circulating currents—the DC/AC-converter is theoretically able to supply substantially the sum of both currents $I_1+I_2$. In practice however, circulating currents flowing from the output 35 of the first half-bridge 36 to the output 37 the second half-bridge 38 and vice-versa cannot be totally avoided. These circulating currents lead to power losses and reduce the efficiency of the DC/AC-converter.

For controlling purpose the DC/AC-converter can comprise several current sensors. In particular, three current sensors 47 are illustrated in FIG. 2 that are configured to detect an output current $I_1$ for each one of the plurality of first half-bridges 35. In addition, three current sensors 48 are shown that are configured to detect an output current $I_2$ for each one of the plurality of second half-bridges 35. For clarity reasons the measured currents $I_1$, $I_2$ are shown for only one of the first and one of the second half-bridges 36, 38. These current sensors 47, 48 can comprise a connection to the control unit 33 (not shown in FIG. 2) in order to consider the currents within the control strategy of the control unit 33. For instance, in order to avoid the saturation of the magnetic core 2 of the inductor assembly 1 it is helpful to observe the current difference $I_1-I_2$ which is a measure for the resulting magnetic flux within the corresponding phase leg 4 during operation of the DC/AC-converter. In one embodiment, that current difference $I_1-I_2$—specifically its absolute value—is to be kept below a certain threshold value via respective control signals sent to the switches of the first and second half-bridges 36, 38 by the control unit 33. That threshold value is a characteristic value depending on a particular design of an individual inductor assembly 1.

However, the inductor assembly 1 in combination with the interleaved control of the first and second half-bridges 36, 38 is able to significantly reduce those circulating currents. During the interleaved control of the first half-bridge 36 relative to the corresponding second half-bridge 38 situations occur, at which there is a voltage difference between the output 35 of the first half-bridge 36 and the output 37 of the corresponding second half-bridge 38. That voltage difference is also present at the first terminal 20 of the upper inductor coil 8 and the fourth terminal of the lower inductor coil 9 and acts as the driving force for the circulating current. The magnetic coupling between the upper inductor coil 8 and its corresponding lower inductor coil 9 however is able to sufficiently reduce the circulating currents.

By way of example, a three—level DC-link 31 in combination with a BSNPC circuit topology of the half-bridges is shown in FIG. 2. In conjunction with the interleaved operation mode this combination leads to an effective five level DC/AC-converter. However, the disclosure is not limited to the illustrated example. Furthermore, also DC-links comprising less or more voltage levels—for instance 2, 4, 5, 7 or even more than 7 voltage levels are possible. Alternatively, also other circuit topologies of the first and second half-bridges 36, 38 are possible. That circuit topologies may comprise any commonly known circuit topology comprising or not comprising a connection to an intermediate voltage level of the DC-link 31. Alternatively to the example shown in FIG. 2 comprising a single upper switch 39, 42 and a single lower switch 40, 43 for each one of the first and second half-bridges 36, 38, the circuit topology of each first and second half-bridge 36, 38 may comprise two high-side switches 39, 42 controlled in a synchronous manner and two low side switches 40, 43 controlled in a synchronous manner. Such a topology is compatible for high voltage values present at the DC-link. With regard to the circuit topologies comprising a connection to an intermediate voltage level of the DC-link 31 the circuit topology for instance may comprise one of: —an NPC or a BSNPC circuit topology.

Switch types that can be used for the switches 39, 40, 41, 42, 43, 44 of the first and second half-bridges 36, 38 of the DC/AC-converter are any controllable semiconductor switches comprising a control terminal. A possible switch type to be used for instance can comprise one of: an insulated gate bipolar transistor IGBT, a Metal-Oxide Semiconductor-Field-Effect Transistor MOSFET, a bipolar junction transistor BJT and a junction gate field effect transistor JFET. Possible materials to be used for that switch types for instance can comprise one of: silicon Si, silicon carbide SiC, gallium nitride GaN and any other commonly available semiconductor switch material. The above mentioned lists of possible switch types and materials to be used for that switch types are only exemplarily and not to be understood as limiting. In case the switches have no intrinsic body diode, a separate diode may be connected in parallel to the respective semiconductor switch in order to provide a free-wheeling path.

A DC/AC-converter comprising three phase terminals U, V, W, as illustrated in FIG. 2 is only an exemplary embodiment of the disclosure and the disclosure is not limited to that structure of the DC/AC-converter. Furthermore also a DC/AC-converter with two, four or more phase terminals at its output is possible. The output may or—as an alternative—may not comprise a neutral terminal N.

Figure 3A:
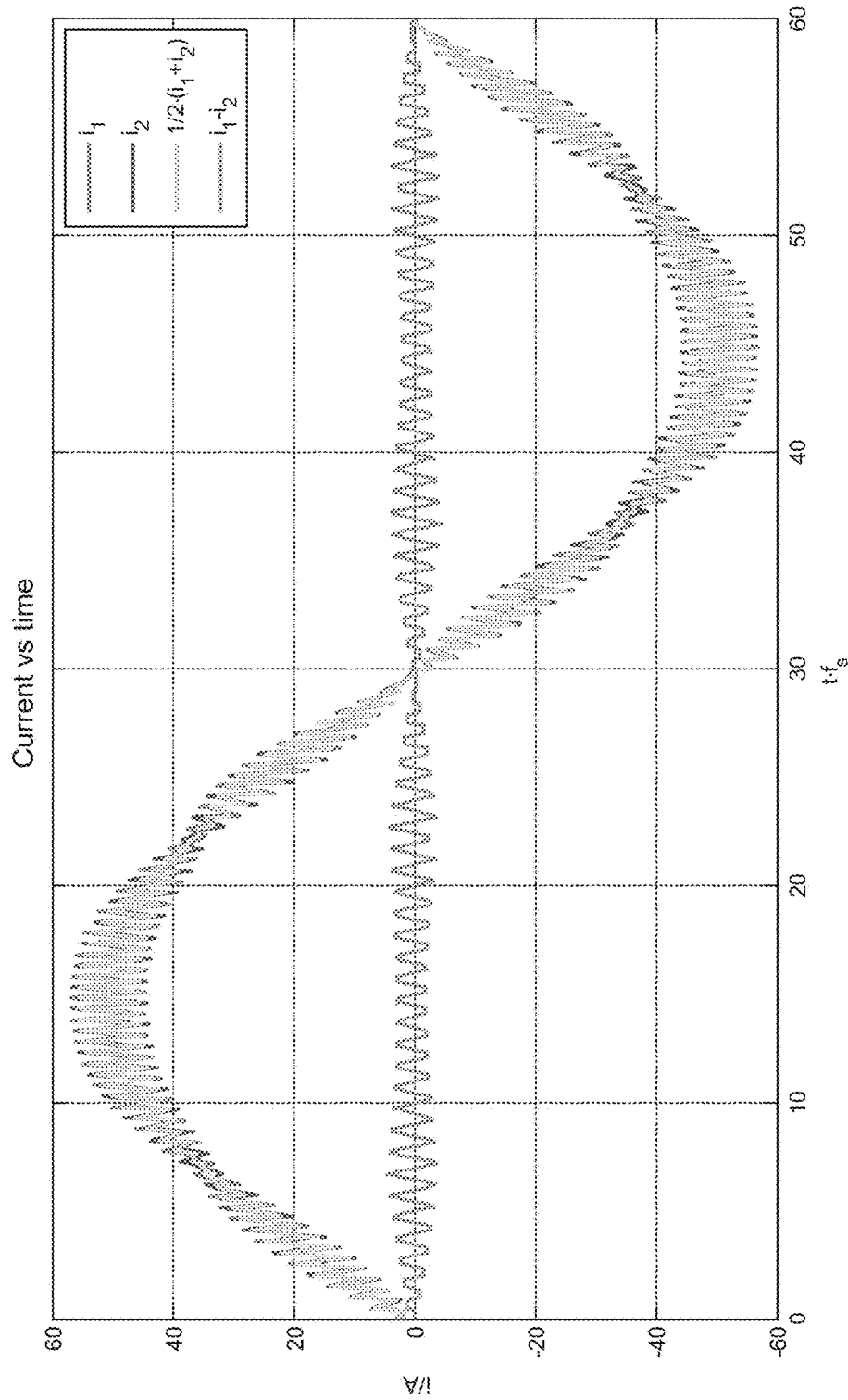
FIG. 3a shows a timing diagram of current values supplied by outputs of two corresponding half-bridges during their interleaved operation for the DC/AC-converter according to FIG. 2.

In FIG. 3a, FIG. 3b, FIG. 3c simulated timing diagrams for voltage and current values during an interleaved operation of the DC/AC-converter according to FIG. 2 are illustrated. The timing diagrams are evaluated with small capacitance values of the capacitors 46 of the output filter 34 of FIG. 2 in order to highlight the characteristic of the different current amounts. FIG. 3a, FIG. 3b and FIG. 3c show the time dependence of the several parameters voltage and current for a time range of a single AC period (here: 0-20 ms) normed to the period of the clocking cycle ($t/T_s$ or $t*f_s$).

FIG. 3a illustrates the currents $I_1$, $I_2$ that are output by the first and the second half-bridge 36, 38 corresponding to a particular one of the phase terminals U, V, W. The currents $I_1$, $I_2$ can be measured via the respective current sensors 47, 48 as illustrated in FIG. 2. The diagram in FIG. 3a also shows the sum current normed to its half, i.e. ½ ($I_1+I_2$). Apart from the factor ½, that sum current represents the output current at the respective phase terminal U, V, W.

In FIG. 3b the voltages $v_1$, $v_2$ present at the outputs 35, 37 of the first half-bridge 36 and its corresponding second half-bridge 38 are illustrated. FIG. 3c shows the difference of those voltages $v_1-v_2$ as well as its average value. ½ ($v_1+v_2$) which represents the voltage that is present at the interconnection point of the second terminal 21 of the upper inductor coil 8 and the third terminal 22 of the lower inductor coil 9. Since the second and the third terminal 21, 22 are both connected to the corresponding one of the respective phase terminals U, V, W that voltage ½ ($v_1+v_2$) approximately is a measure for the voltage output by the DC/AC-converter to the corresponding one of the respective phase terminals U, V, W. Looking on the average value ½ ($v_1+v_2$) of the voltages $v_1$, $v_2$, FIG. 3c also shows that the 3 level DC-link 31 in combination with the interleaved control of the first and second half-bridges 36, 38 lead to an effective 5 level voltage signal.

Figure 4:
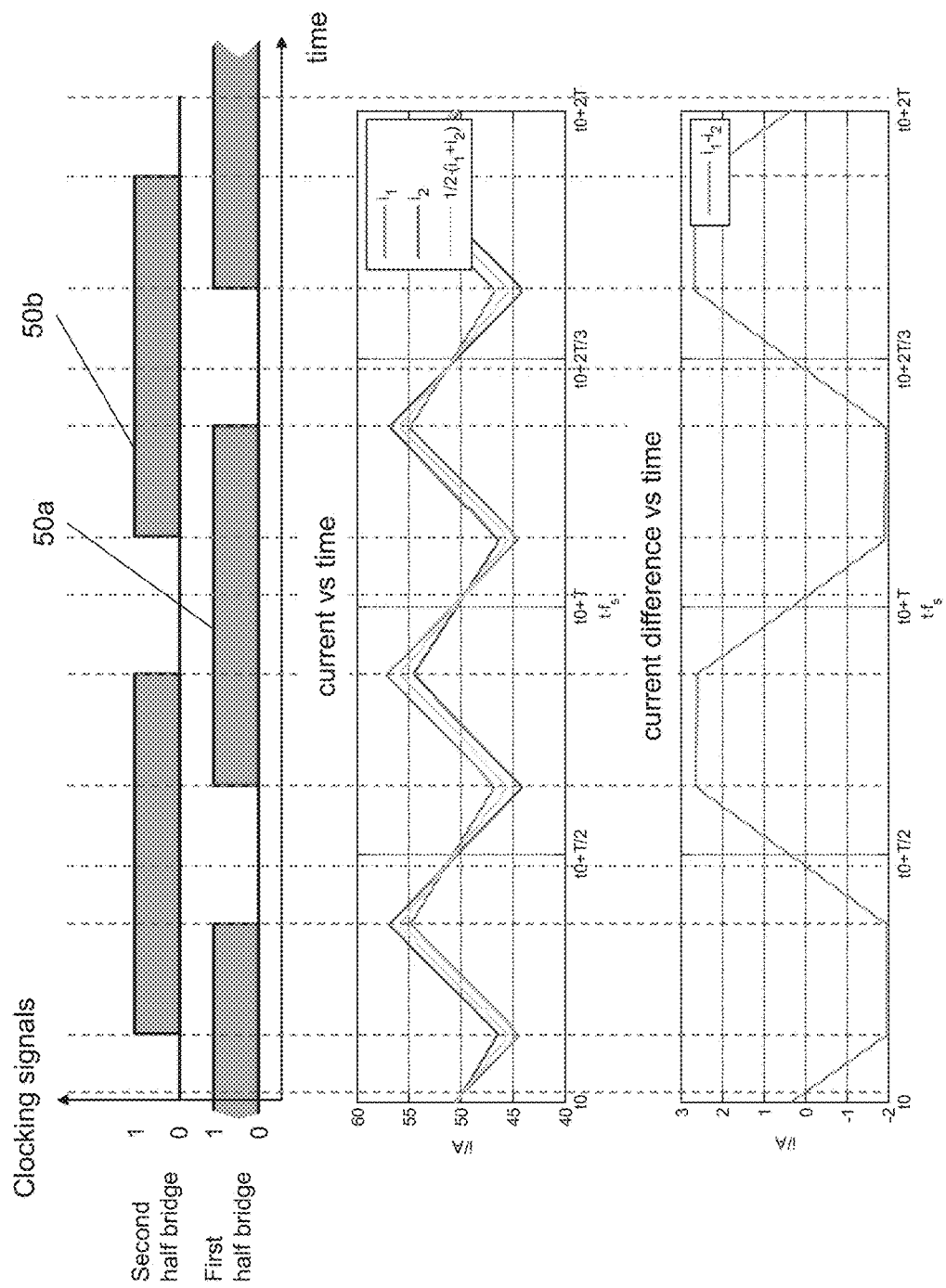
FIG. 4 shows timing diagrams of current values according to FIG. 3a together with relevant clocking signals for fast switching switches of two corresponding half-bridges at a stretched time scale as compared to FIG. 3c during their interleaved operation for the DC/AC-converter of FIG. 2.

In FIG. 4 timing diagrams of the currents $I_1$, $I_2$ as illustrated in FIG. 3a are drawn using a significantly stretched time scale, which time scale is chosen to represent two clocking cycles of fast switching switches of the first and second half-bridge 36, 38 during their interleaved operation. In the upper diagram of FIG. 4 the clocking signals 50a for the fast switching switch of the first half-bridge 36 and the clocking signals 50b for the fast switching switch of the corresponding second half-bridge 38 are drawn. The diagram clearly shows that the fast switching switch of the second half-bridge 36 is clocked with a phase shift of substantially 180° relative to the fast switching switch of the corresponding first half-bridge 36. In the middle diagram of FIG. 4 the currents $I_1$, $I_2$ resulting from the clocking signals 50a, 50b shown in the upper diagram above are illustrated. Also illustrated is again the normed sum value ½ ($I_1+I_2$) that—apart from the norming factor ½—is a measure of the output current supplied through the corresponding phase terminal U, V, W. In the lower part of FIG. 4 a diagram of the current difference $I_1-I_2$ is illustrated. As mentioned in the description of FIG. 1d that current difference is a measure for the resulting magnetic flux within the respective phase leg 4 of the inductor assembly 1—in particular in the upper and lower section 10, 11, and the upper and the lower bridge 13 of that phase leg 4. A change of that current difference $I_1-I_2$ also changes the resulting magnetic flux within that phase leg 4. The current difference also is a measure for the circulating current flowing between the outputs 35, 37 of the first and the second half-bridge 36, 38.

FIG. 5a shows an alternative embodiment of a power supply system 60 according to the disclosure. The power supply system 60 is configured to operate as a DC/DC converter, in particular a boost converter. The boost converter comprises an input 61 for receiving an input voltage $V_{in}$, an output 62 for supplying an output voltage $V_{out}$, and a number of n (here: n=2) switching cells 64 connected in parallel to the output 62. Each switching cell 64 comprises a first and a second switching path 65a, 65b connected in parallel to each other and in parallel to the output 62. Each switching path 65a, 65b comprises a series connection of a first semiconductor switch 66 and a second semiconductor switch 67 and an interconnection point 68 between them. A control unit 63 is configured to control the first semiconductor switch 66 of the first switching path 65a in an interleaved manner relative to the first semiconductor switch 66 of the second switching path 65b. In the embodiment of FIG. 5a, only the first semiconductor switches 66 are semiconductor switches controlled by the control unit 63, whereas the second semiconductor switches 67 are shown as diodes. Alternatively to the diodes it is also possible to use semiconductor switches that are controlled by the control unit 63 as second semiconductor switches 67—like it is the case for the first semiconductor switches 66.

The DC/DC converter further comprises an inductor assembly 1 according to the disclosure coupling each one of the n switching cells 64 to the input 61. Each one of the n switching cells 63 is associated to a different corresponding phase leg 4 of the inductor assembly 1 and coupled to the input 61 via the upper inductor coil 8 and the lower inductor coil 9 of that corresponding phase leg 4. In detail, for each one of the n switching cells 63 the inductor assembly 1 is connected such that the interconnection point 68 of the first switching path 65a is connected to the first terminal 20 of the upper inductor coil 8 and the interconnection point 68 of the second switching path 65b is connected to the fourth terminal 23 of the lower inductor coil 9. Additionally, the second terminal 21 of the upper inductor coil 8 and the third terminal 22 of the lower inductor coil 9 are both connected to the input 61.

During operation of the DC/DC converter the two first semiconductor switches 66 of each of the n switching cells 64 are controlled by the control unit 63 in an interleaved switching mode. In one embodiment, that interleaved switching of the first semiconductor switch 66 of the first switching path 65a and the first semiconductor switch 66 of the second switching path 65b comprise a phase shift of substantially 180° relative to each other.

Figure 5B:
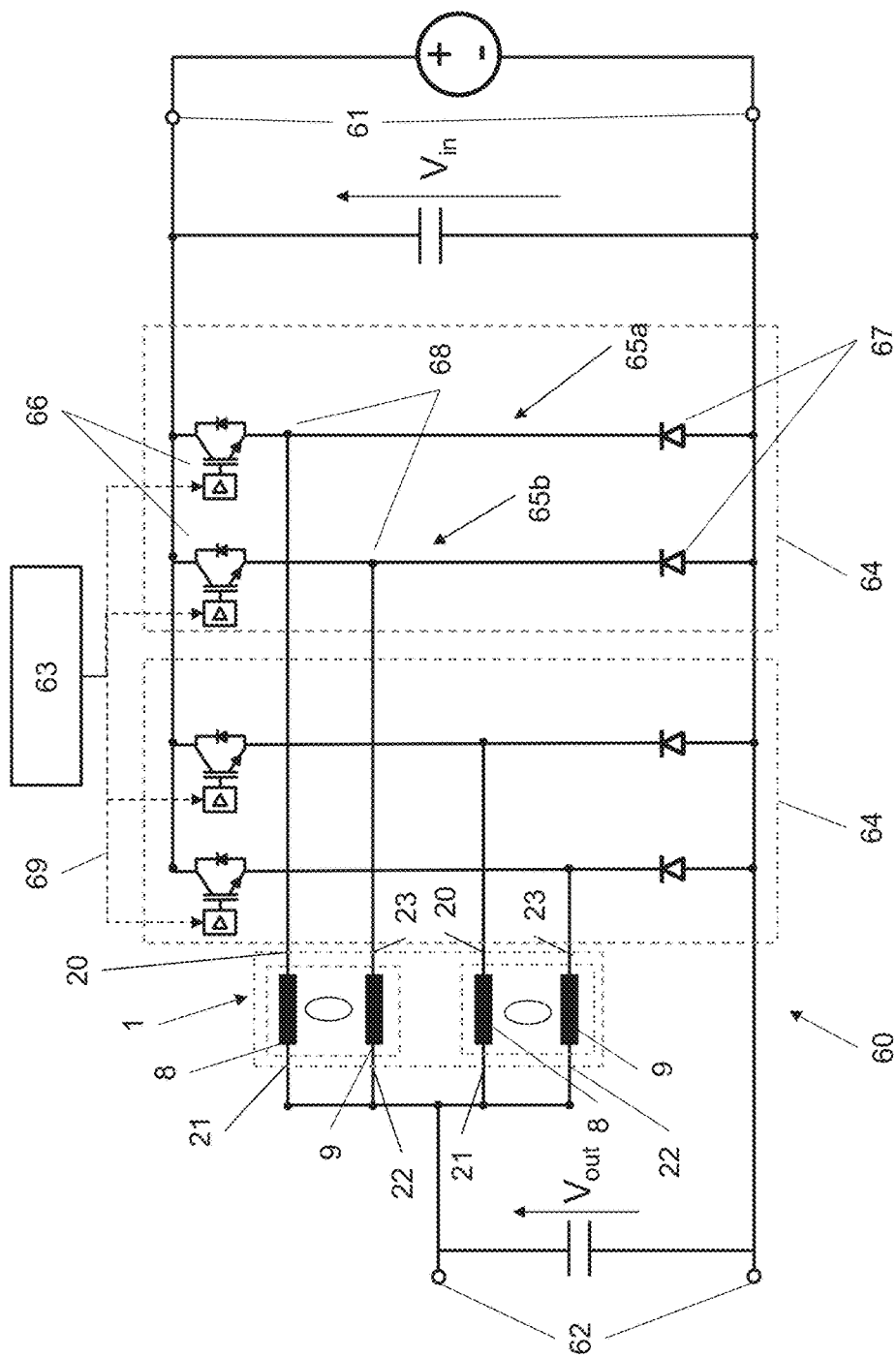
FIG. 5b shows a buck converter as example for a power supply system containing an inductor assembly according to this disclosure.

In FIG. 5b an alternative DC/DC converter as example for a switch mode power supply system 60 according to the disclosure is illustrated. In this case, the DC/DC converter containing the inductor assembly 1 according to this disclosure is configured to operate as a buck converter.

The buck converter can be derived from the boost converter described in FIG. 5a mainly by interchanging the locations of output 62 and input 61 and additionally interchanging the location of the first semiconductor switches 66 and the second semiconductor switches 66 within the respective first and second switching paths 65a, 65b. Apart from that difference, the description of the boost converter with regard to FIG. 5a can also be transferred to the buck converter according to FIG. 5b. Therefore, regarding further details of the embodiment according to FIG. 5b it is referred to the description of FIG. 5a.

In one embodiment, the DC/DC-converter described in FIG. 5a, and FIG. 5b comprises two, three or even more switching cells 64. The higher the number n of parallel connected switching cells, the higher the possible current supply by the DC/DC-converter.

Switch types that can be used for the first semiconductor switch 66—and optionally also for the second semiconductor switch 67—of the DC/DC-converter are any controllable semiconductor switches comprising a control terminal. With regard to possible switch types and/or materials that can be used for that switch types it is referred to the description of FIG. 2. Any switch type and/or material already disclosed within the description of FIG. 2 can also be used for the first semiconductor switch 66—and optionally also for the second semiconductor switch 67—of the DC/DC converters. This is independent of whether the DC/DC converter is a buck converter or a boost converter.

In order to minimize a voltage ripple at the output 62 of the DC/DC converter, each switching cell 64 in one embodiment is controlled by the control unit 63 in an interleaved manner to each one of the other switching cells 64. In particular, the control unit 63 controls all first semiconductor switches 66 of each switching cells 64 with substantially the same clocking frequency. The first semiconductor switches 66 associated with the same switching cell 64 are clocked in an interleaved manner comprising a phase shift of substantially 180° relative to each other. Additionally, the control unit 63 controls the first semiconductor switches 66 such that an arbitrary first semiconductor switch 66 associated with a first switching cell 64 is also clocked in a further interleaved manner relative to an arbitrary first semiconductor switch 66 of a second switching cell 64. In one embodiment, that further interleaved manner comprises a phase shift of substantially 180°/n or 180°+180°/n, wherein n corresponds to the number of switching cells, and in case of two three switching cells n=2 or n=3. This control strategy leads to a more uniform temporal distribution of the switching of the plurality of first semiconductor switches 66 and therefore minimizes a ripple of the output voltage $V_{out}$ of the power supply system 60.

The invention claimed is:

1. A power supply system configured to operate as a DC/AC-converter comprising:
a DC-link,
a number n of phase terminals at an output, wherein each one of the n phase terminals is connected to a corresponding first half-bridge and a corresponding second half-bridge of the DC/AC-converter,
a control unit configured to control the corresponding second half-bridge for each phase terminal in an interleaved manner relative to the corresponding first half-bridge, and
an output filter comprising an inductor assembly, the inductor assembly comprising:
a magnetic core with a center leg and a number n of phase legs, wherein n is an integer and n>1,
wherein each phase leg is magnetically connected to the center leg by an upper bridge and a lower bridge to form a magnetic main loop, and a midpoint of the phase leg being magnetically connected to a center point of the center leg by a shunt element comprising a gap,
wherein each phase leg further comprises an upper inductor coil disposed on an upper phase leg section located between the midpoint and the upper bridge and a lower inductor coil disposed on a lower phase leg section located between the midpoint and the lower bridge, or each phase leg further comprises an upper inductor coil disposed on the upper bridge and a lower inductor coil disposed on the lower bridge,
wherein the upper inductor coil comprises a first terminal and a second terminal and wherein the lower inductor coil comprises a third terminal and a fourth terminal,
wherein the second terminal of the upper inductor coil and the third terminal of the lower inductor coil are connected to each other in order to form a series connection of the upper inductor coil and the lower inductor coil, and
wherein a winding direction of the upper inductor coil relative to a winding direction of the lower inductor coil is such that a current flowing from the first terminal of the upper inductor coil to the fourth terminal of the lower inductor coil generates a magnetic flux for each one of the upper inductor coil and the lower inductor coil that are superposing constructively within the respective phase leg,
wherein each phase terminal is connected to an output of the corresponding first half-bridge via an upper inductor coil of a corresponding phase leg, and connected to an output of the corresponding second half-bridge via a lower inductor coil of the corresponding phase leg,
wherein for each phase terminal the corresponding first half-bridge and the corresponding second half-bridge are connected to the DC-link in parallel,
wherein for each phase leg of the inductor assembly the upper inductor coil is connected with its first terminal to the output of the corresponding first half-bridge and the lower inductor coil is connected with its fourth terminal to the output of the corresponding second half-bridge, and
wherein for each phase leg of the inductor assembly the second terminal of the upper inductor coil and the third terminal of the lower inductor coil are both connected to the respective phase terminal.

2. The power supply system of claim 1, wherein for each phase terminal the corresponding second half-bridge is clocked in an interleaved manner relative to the corresponding first half-bridge, wherein the interleaved manner comprises a phase difference of 180° with a tolerance of ±5°.

3. The power supply system of claim 1, wherein each one of the plurality of first and second half-bridges comprises a topology with a single High-Side switch and a single Low-Side switch.

4. The power supply system of claim 1, wherein each one of the plurality of first and second half-bridges comprises a topology with two High-Side switches connected in series controlled in a substantially synchronous manner and two Low-Side switches connected in series controlled in a substantially synchronous manner by the control unit, wherein the substantially synchronous manner is equivalent to a phase difference of 0° with a tolerance of ±5°.

5. The power supply system of claim 1, wherein all of the plurality of first and second half-bridges comprise an identical circuit topology, which circuit topology is one of a Neutral-Point-Clamped (NPC) and a Bipolar-Switched-Neutral-Point-Clamped (BSNPC) topology.

6. The power supply system of claim 1, wherein the power supply system comprises two phase terminals and a neutral terminal or alternatively three phase terminals and a neutral terminal at its output.

7. The power supply system of claim 1, wherein all of the plurality of first and second half-bridges comprise an identical circuit topology, which circuit topology is one of a two level circuit topology, a three level circuit topology, a four level circuit topology, a five level circuit topology, a seven level circuit topology and a nine level circuit topology.

8. A power supply system configured to operate as a DC/DC-converter, comprising:
   an input configured to receive an input voltage Vin,
   an output configured to supply an output voltage Vout,
   a number of n switching cells connected in parallel to the output, wherein each one of the n switching cells comprises:
      a first and a second switching path connected in parallel to each other, wherein each switching path comprises a series connection of a first semiconductor switch and a second semiconductor switch and an interconnection point between them, and
   a control unit, configured to control the first semiconductor switch of the first switching path in an interleaved manner relative to the first semiconductor switch of the second switching path,
   an inductor assembly, comprising:
      a magnetic core with a center leg and a number n of phase legs, wherein n is an integer and n>1,
      wherein each phase leg is magnetically connected to the center leg by an upper bridge and a lower bridge to form a magnetic main loop, and a midpoint of the phase leg being magnetically connected to a center point of the center leg by a shunt element comprising a gap,
      wherein each phase leg further comprises an upper inductor coil disposed on an upper phase leg section located between the midpoint and the upper bridge and a lower inductor coil disposed on a lower phase leg section located between the midpoint and the lower bridge, or each phase leg further comprises an upper inductor coil disposed on the upper bridge and a lower inductor coil disposed on the lower bridge,
      wherein the upper inductor coil comprises a first terminal and a second terminal and wherein the lower inductor coil comprises a third terminal and a fourth terminal,
      wherein the second terminal of the upper inductor coil and the third terminal of the lower inductor coil are connected to each other in order to form a series connection of the upper inductor coil and the lower inductor coil, and
      wherein a winding direction of the upper inductor coil relative to a winding direction of the lower inductor coil is such that a current flowing from the first terminal of the upper inductor coil to the fourth terminal of the lower inductor coil generates a magnetic flux for each one of the upper inductor coil and the lower inductor coil that are superposing constructively within the respective phase leg,
   wherein the inductor assembly is configured to connect each one of the n switching cells to the input, wherein each one of the n switching cells is associated to a different corresponding phase leg of the inductor assembly and connected to the input via the upper inductor coil and the lower inductor coil of that corresponding phase leg, such that for each one of the n switching cells, the interconnection point of the first switching path is connected to the first terminal of the upper inductor coil and the interconnection point of the second switching path is connected to the fourth terminal of the lower inductor coil, and wherein the second terminal of the upper inductor coil and the third terminal of the lower inductor coil are both connected to the input.

9. The power supply system of claim 8, wherein the power supply system comprises two or three switching cells,
   wherein the first semiconductor switches of each switching cell are controlled by the control unit with substantially the same clocking frequency,
   wherein the first semiconductor switches associated with the same switching cell are clocked in an interleaved manner comprising a phase shift of 180° with a tolerance of ±5° relative to each other, and
   wherein an arbitrary first semiconductor switch associated with a first switching cell is clocked in a further interleaved manner relative to an arbitrary first semiconductor switch of a second switching cell comprising a phase shift of 180°/n with a tolerance of ±5° or (180°+180°/n) with a tolerance of ±5°, wherein n=2 or n=3.

10. A power supply system configured to operate as a DC/DC-converter comprising:
   an input configured to receive an input voltage Vin,
   an output configured to supply an output voltage Vout,
   a number of n switching cells connected in parallel to the input, wherein each one of the n switching cells comprises:
      a first and a second switching path connected in parallel to each other, wherein each switching path comprises a series connection of a first semiconductor switch and a second semiconductor switch and an interconnection point between them, and
   a control unit, configured to control the first semiconductor switch of the first switching path in an interleaved manner relative to the first semiconductor switch of the second switching path,
   an inductor assembly, comprising:
      a magnetic core with a center leg and a number n of phase legs, wherein n is an integer and n>1,
      wherein each phase leg is magnetically connected to the center leg by an upper bridge and a lower bridge to form a magnetic main loop, and a midpoint of the phase leg being magnetically connected to a center point of the center leg by a shunt element comprising a gap,
      wherein each phase leg further comprises an upper inductor coil disposed on an upper phase leg section located between the midpoint and the upper bridge and a lower inductor coil disposed on a lower phase leg section located between the midpoint and the lower bridge, or each phase leg further comprises an upper inductor coil disposed on the upper bridge and a lower inductor coil disposed on the lower bridge,
      wherein the upper inductor coil comprises a first terminal and a second terminal and wherein the lower inductor coil comprises a third terminal and a fourth terminal,
      wherein the second terminal of the upper inductor coil and the third terminal of the lower inductor coil are connected to each other in order to form a series connection of the upper inductor coil and the lower inductor coil, and wherein a winding direction of the upper inductor coil relative to a winding direction of the lower inductor coil is such that a current flowing from the first terminal of the upper inductor coil to the fourth terminal of the lower inductor coil generates a magnetic flux for each one of the upper inductor coil and the lower inductor coil that are superposing constructively within the respective phase leg, wherein the inductor assembly is configured to connect each one of the n switching cells to the output, wherein each one of the n switching cells is associated to a different corresponding phase leg of the inductor assembly and connected to the output via the upper inductor coil and the lower inductor coil of that corresponding phase leg, such that for each one of the n switching cells, the interconnection point of the first switching path is connected to the first terminal of the upper inductor coil and the interconnection point of the second switching path is connected to the fourth terminal of the lower inductor coil, and wherein the second terminal of the upper inductor coil and the third terminal of the lower inductor coil are both connected to the output.

11. The power supply system of claim 10, wherein the power supply system comprises two or three switching cells, wherein the first semiconductor switches of each switching cell are controlled by the control unit with substantially the same clocking frequency, wherein the first semiconductor switches associated with the same switching cell are clocked in an interleaved manner comprising a phase shift of 180° with a tolerance of ±5° relative to each other, and wherein an arbitrary first semiconductor switch associated with a first switching cell is clocked in a further interleaved manner relative to an arbitrary first semiconductor switch of a second switching cell comprising a phase shift of 180°/n with a tolerance of ±5° or (180°+180°/n) with a tolerance of ±5°, wherein n=2 or n=3.

* * * * *